(12) United States Patent
Dudley

(10) Patent No.: US 9,937,665 B2
(45) Date of Patent: Apr. 10, 2018

(54) 3D PRINTING USING SPIRAL BUILDUP

(71) Applicant: ORANGE MAKER LLC, Philadelphia, PA (US)

(72) Inventor: Kurt Dudley, Thousand Oaks, CA (US)

(73) Assignee: ORANGE MAKER, LLC, Philadelphia, PA (US)

(*) Notice: Subject to any disclaimer, the term of this patent is extended or adjusted under 35 U.S.C. 154(b) by 189 days.

(21) Appl. No.: 15/088,365

(22) Filed: Apr. 1, 2016

(65) Prior Publication Data

US 2016/0214322 A1   Jul. 28, 2016

Related U.S. Application Data

(62) Division of application No. 14/207,353, filed on Mar. 12, 2014, now Pat. No. 9,321,215.

(60) Provisional application No. 61/778,285, filed on Mar. 12, 2013.

(51) Int. Cl.
| | | |
|---|---|---|
| B29C 67/00 | (2017.01) | |
| B33Y 10/00 | (2015.01) | |
| B33Y 30/00 | (2015.01) | |

(52) U.S. Cl.
CPC ...... B29C 67/0085 (2013.01); B29C 67/0062 (2013.01); B29C 67/0066 (2013.01); B29C 67/0077 (2013.01); B33Y 10/00 (2014.12); B33Y 30/00 (2014.12); B29K 2909/08 (2013.01)

(58) Field of Classification Search
CPC .... B33Y 10/00; B33Y 30/10; B29K 2909/08; B29C 67/0062; B29C 67/0066; B29C 67/0077; B29C 67/0085

USPC ...... 264/401, 497, 113; 425/150, 375, 174.4
See application file for complete search history.

(56) References Cited

U.S. PATENT DOCUMENTS

| | | | |
|---|---|---|---|
| 5,247,180 A | 9/1993 | Mitcham et al. | |
| 7,614,866 B2 | 11/2009 | Sperry et al. | |
| 8,021,138 B2 | 9/2011 | Green | |
| 8,894,400 B2 | 11/2014 | Costabeber | |
| 9,434,107 B2* | 9/2016 | Zenere | B29C 67/0066 |

(Continued)

FOREIGN PATENT DOCUMENTS

| | | |
|---|---|---|
| CN | 101067720 A | 11/2007 |
| WO | WO2000-52624 A1 | 9/2000 |

(Continued)

OTHER PUBLICATIONS

Search Report and Written Opinion of International Application No. PCT/US2014/025026, dated Aug. 20, 2014.

(Continued)

*Primary Examiner* — Nahida Sultana

(74) *Attorney, Agent, or Firm* — Koppel, Patrick, Heybl & Philpott; Michael J. Ram

(57) ABSTRACT

Methods, devices and systems for efficient 3D printing that address conventional inefficiencies while utilizing a single compact device are set forth. Some embodiments utilize a circular-shaped build area revolving symmetrically around a single center point utilizing a continuous helical printing process. In one embodiment a liquid photopolymer for solidification is deposited on a build platform to form the physical object The Build platform is continuously rotated and simultaneously raised in a gradual programmed manner. Focused from below the platform produces a single continuous "layer" of material deposited and bonded in a helical fashion.

34 Claims, 18 Drawing Sheets

(56) References Cited

U.S. PATENT DOCUMENTS

| | | | |
|---|---|---|---|
| 9,457,516 B2 * | 10/2016 | Costabeber | ......... B29C 67/0062 |
| 2003/0090034 A1 | 5/2003 | Mulhaupt | |
| 2004/0159967 A1 | 8/2004 | Farnworth | |
| 2004/0207124 A1 | 10/2004 | Kritchrnan | |
| 2005/0211922 A1 | 9/2005 | Munekane | |
| 2008/0171284 A1 | 7/2008 | Hull | |
| 2009/0020901 A1 | 1/2009 | Schillen et al. | |
| 2011/0101569 A1 | 5/2011 | Yasukochi | |
| 2011/0309554 A1 | 12/2011 | Liska | |
| 2012/0113457 A1 | 5/2012 | Pettis | |
| 2012/0133083 A1 | 5/2012 | Zenere | |
| 2012/0195994 A1 | 8/2012 | El-Siblani | |
| 2014/0339741 A1 | 11/2014 | Aghababaie | |
| 2015/0064298 A1 | 3/2015 | Syao | |
| 2015/0102531 A1 | 4/2015 | El-Siblani | |
| 2015/0140151 A1 | 5/2015 | Schmehl | |

FOREIGN PATENT DOCUMENTS

| | | |
|---|---|---|
| WO | WO2004-005014 | 1/2004 |
| WO | WO2012-070053 | 5/2012 |
| WO | WO2012-085914 A1 | 6/2012 |
| WO | WO2012/143785 A1 | 10/2012 |

OTHER PUBLICATIONS

Search Report of corresponding China Patent Application No. 2014800269694, dated Jul. 25, 2016.

* cited by examiner

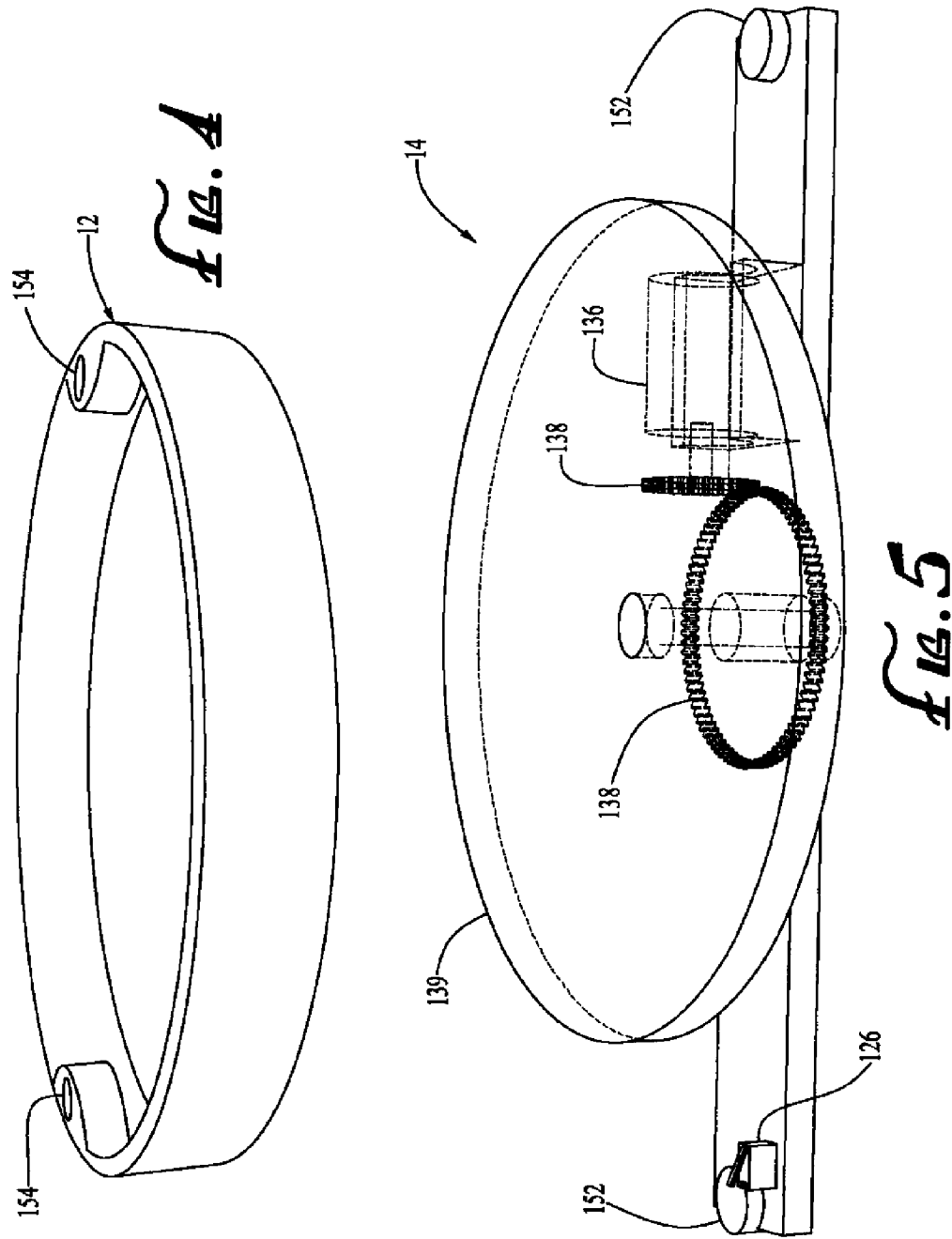

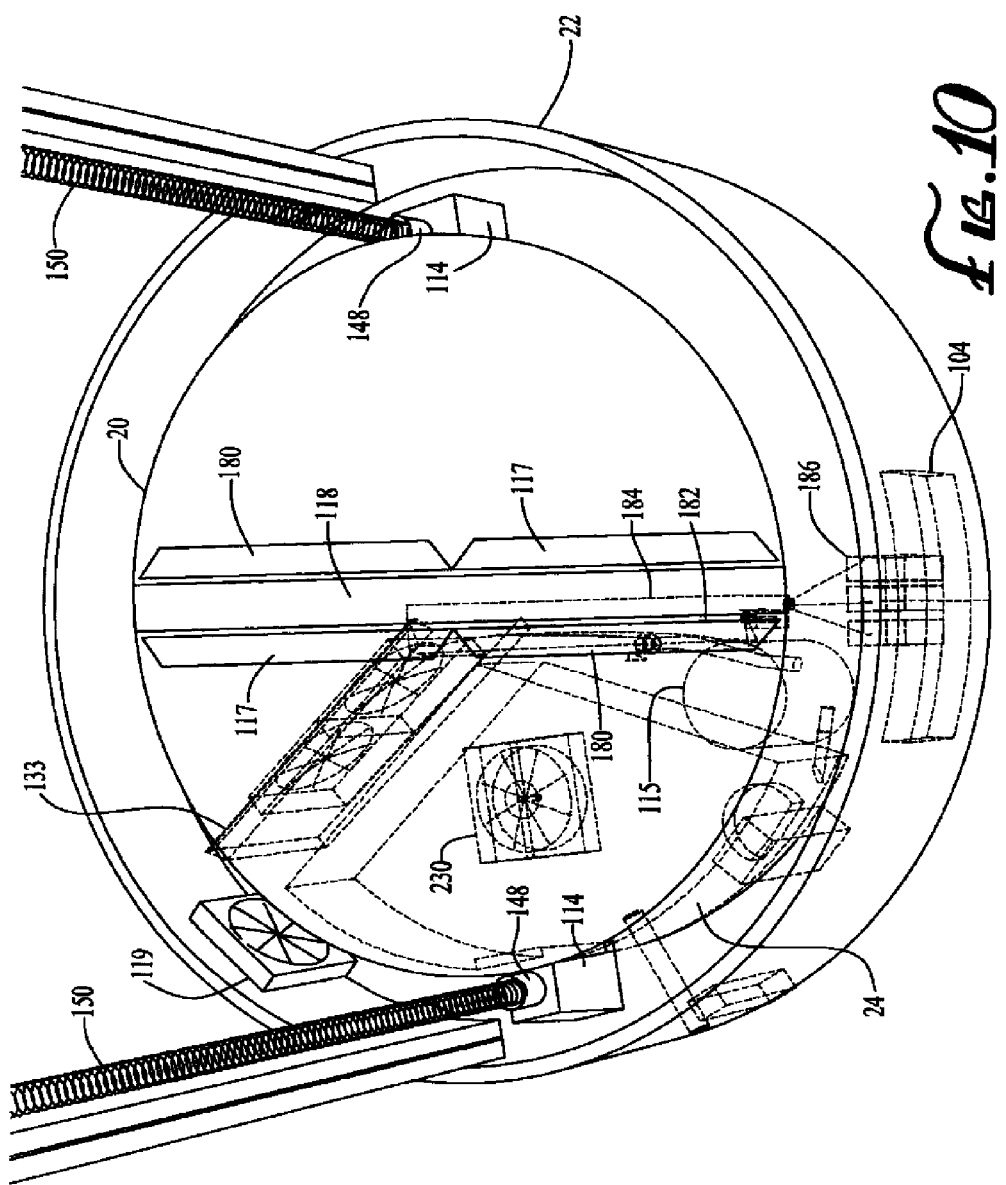

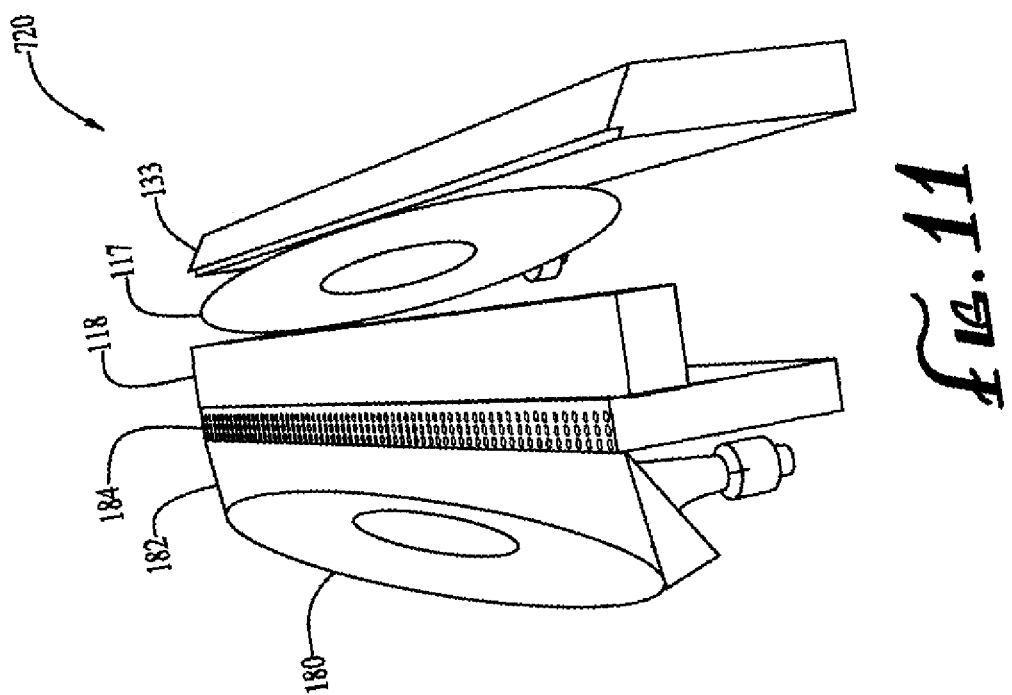

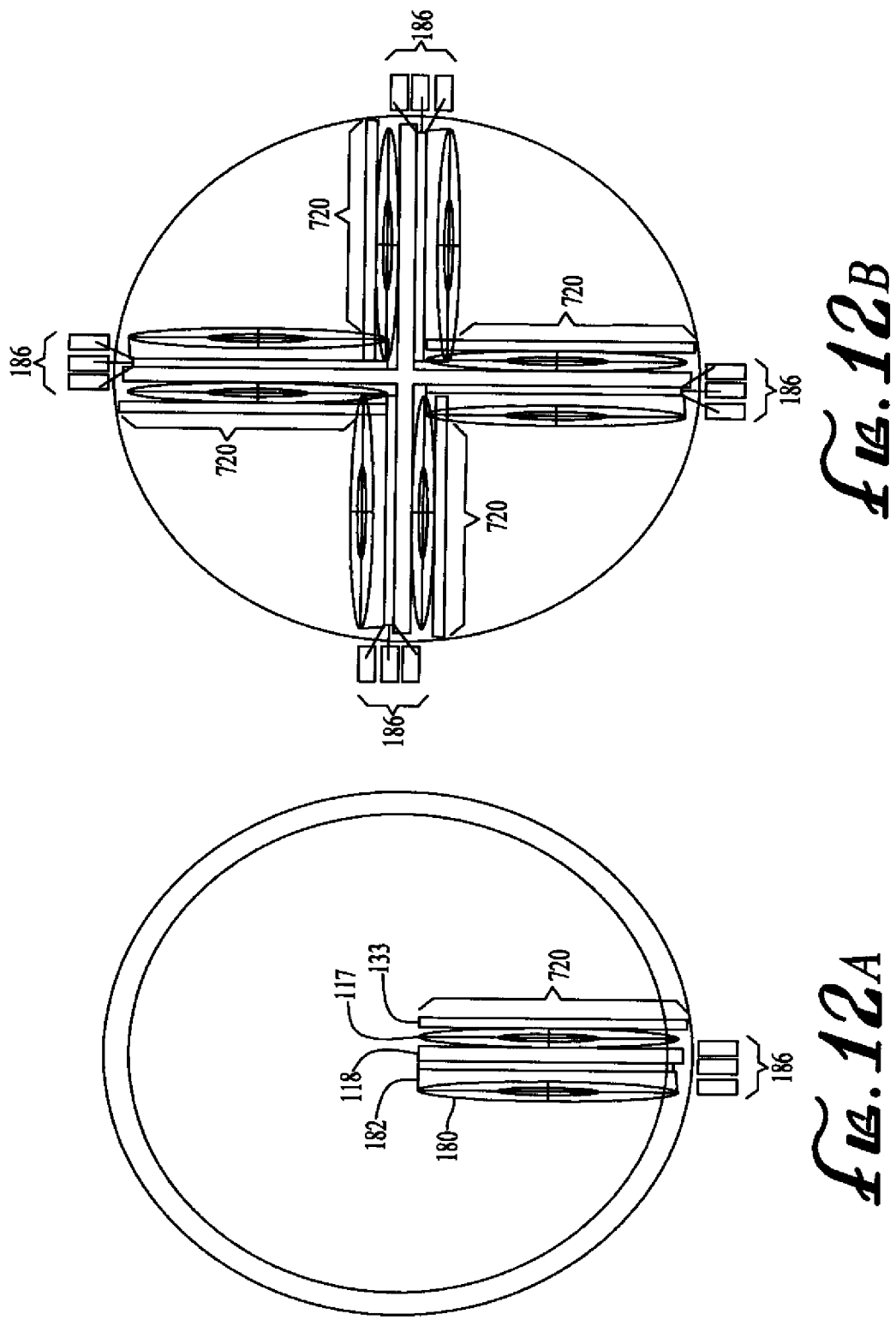

3D PRINTING USING SPIRAL BUILDUP

CROSS REFERENCE TO RELATED APPLICATIONS

This application is a Divisional of U.S. patent application Ser. No. 14/207,353 filed Mar. 12, 2014, now U.S. Pat. No. 9,321,215 B2, which claims the benefit of U.S. Provisional Application Ser. No. 61/778,285 to Kurt Dudley, entitled 3D PRINTING USING SPIRAL BUILDUP, filed on Mar. 12, 2013. These applications are hereby incorporated herein in its entirety by reference, including, but not limited to, the drawings, charts, schematics, diagrams and related written description.

BACKGROUND OF THE INVENTION

Field of the Invention

Described herein are methods, procedures and devices for forming three-dimensional (3D) objects from a wide variety of media, such as a polymeric, biological or metallic materials. The methods, procedures and devices are programmed to produce desired three dimensional (3D) structures using polymerization, crosslinking, curing, sintering, melting or solidification and similar techniques in a manner constituting improvements over conventional stereolithographic, photocurable, or other 3D object forming techniques.

Description of the Related Art

In recent years, 3D printing has been demonstrated to be an effective technique for accurately forming 3D objects, such as for the purpose of prototyping and manufacture. In its most general sense, 3D printing typically utilizes a 3D scanner and/or computer software to generate an image map of a desired object. That image map is then translated into a grid-like structure such that a fabrication device can deposit a flowable material, such as a plastic, polymer, biomaterial or resin, via an additive process, which is simultaneously solidified creating a 3D object. Various existing 3D printing methodologies which provide unique advantages and also each have their own disadvantages.

One such methodology is stereolithography, credited as being developed by Charles W. Hull and set forth, for example, in U.S. Pat. No. 4,575,330. Stereolithography aims to create three-dimensional objects based on the successive linear formation of layers of a fluid-like medium adjacent to previously formed layers of medium and the selective solidification of those layers according to cross-sectional data representing successive slices of the desired three-dimensional object in order to form solid layers. Stereolithography technology uses a liquid medium that is typically a melted thermoplastic or a photopolymer which is selectively solidified. The thermoplastic solidifies by exposure to a lower temperature; the photopolymer is solidified by exposing it to radiation usually in the UV or visible wavelengths causing the polymer to crosslink or cure. Typical methods for directing this radiation onto photocurable materials include motor controlled scanning mirrors, mask systems or lasers wherein the smallest physical resolution is the size of the laser beam or, within the mask, the size of a pixel.

Stereolithography-based machines solidifying photopolymer-based resins typically utilize a singular, focused laser point which is scanned in the X-Y plane using a physical gantry system or is otherwise directed by electromechanically-driven highly reflective surfaces such as galvanometers or rotating polygon mirrors. Because of this, print speed is inversely proportional to both layer density and layer volume.

A method of using the "singular point" type of stereolithography to solidify photopolymers includes utilizing a laser and controllable mirror configuration is described in U.S. Pat. No. 4,575,330 to Hull. The process utilizes incrementally submerging a build-platform in a vat of photocurable material, wherein a layer of material that covers the build platform is solidified via targeted radiation from a laser using two controllable mirrors which direct the radiation in a x/y plane along the surface of the material. Areas are selectively solidified corresponding to cross-sectional data represented in a cross sectional bitmap image of a slice of a virtual three-dimensional model representing an object. Lines are traced over the liquid surface to solidify the photocurable material. The process is repeated multiple times by lowering the build platform into the vat of material by an amount correlating to the next desired layer height. After new material is deposited over the construction area, the process of solidification repeats to form the individual stacked layers to form a three dimensional object.

Another method, which utilizes a "plane exposure" type stereolithography, is the use of a Digital Micromirror Device (DMD)-based variation on the stereolithography process. These variations provide significant improvements in print speed and create a constant build time independent of layer density for a given layer volume, because DMD arrays can expose and direct entire planes of focused light at once rather than a singular point which must be scanned to create a layer. A typical 720×480 DMD array can expose 345,600 individual "pockets" of solidified resin, also known as voxels, all at once in a single layer exposure. Typical layer exposure times can range from 0.2-10+ seconds, depending on a variety of factors. DMD-based processes can work very well for small print sizes, but once a critical layer area is surpassed, the suction force generated by layer-peeling mechanism will inhibit buildup of the 3D object.

There are several limitations to the above processes. For example, resolution is proportional to the focusable point size of the laser; if it is desired to increase the resolution, a smaller point size must be used. This has the consequence of increasing the total amount of lines to be traced in a given area, resulting in longer construction times. Additionally, the process of submerging a platform in a vat of material is both limiting to the functional size of the object that can be created and also requires exposure of large volumes of photocurable materials to construct the 3D object.

Furthermore, the above method of subjecting a fluid surface to radiation poses its own set of issues with regards to consistent layer heights and errors that can be caused from disturbances to the liquid surface. These disturbances can result from both internal and external sources of vibration. The layer height, and therefore the vertical resolution of the object, is also dependent on the viscosity and surface tension of the material used. This limits the vertical resolution that is attainable with a given range of materials.

Recently, an inverted sterolithographic process has been developed that introduces the additional factor of surface adhesion resulting from a newly solidified layer adhering to the bottom of a vat. This adhesion force increases as a function of the size of the solidified layer. However, before the construction process can resume, the adhesion force must be removed and the build platform raised to allow new material to be placed prior to the solidification of the next additional layers of material, for example, via use of prying, tilting, peeling and sliding.

These processes for removal of the adhesion force place the vat, the build platform, the raising element for the build platform and the newly solidified geometries of the printed object under high stress loads that can decrease the functional life of the machine and its components, as well as causing deformations and delamination of the object being constructed. A method to reduce this surface adhesion in large area solidification is described in European patent application EP 2419258 A2, where a single layer is broken into sub component images that are solidified and separated individually. This method, however, doubles the construction time and increases the chance for product failure due to delamination caused by increasing the amount of unsupported areas to be solidified.

Common areas where all rapid manufacturing systems can be improved upon comprise increasing resolution, enhancing scalability of constructible parts, increasing the ability to construct difficult geometries, such as hollow cavities and overhangs, and increasing the ability to construct and preserve small and fragile geometries, such as those having little surrounding support. Time to construct individual layers and total construction time are other important factors relating to the efficiency of the construction process of every system each of which has to its own set of unique limiting factors that dictate how long it will take to construct of a given object. Efficient methods and devices that address these conventional inefficiencies while utilizing a single compact device is therefore needed.

SUMMARY

Described herein are methods, devices and systems for efficient 3D printing that address inefficiencies and deficiencies of currently existing 3D printing systems utilizing a single device. For ease of explanation and to provide an efficient nomenclature, the formation of 3D structures using the new techniques, procedures and devices set forth and incorporating features of the present invention are referred to as heliolithography. Heliolithography provides solutions to the above mentioned inherent problems associated with traditional prototyping techniques. It allows 3-dimensional solid physical products to be made directly from computer-driven data and reproduced with very high and accurate levels of detail, in a short time using a completely automated process. Certain aspects of Heliolithography are similar to stereolithography. Both Heliolithography-based and stereolithography-based processes can utilize a variety of materials as their base material, and these materials are solidified into physical parts through various solidification techniques, such as a free radical polymerization of photopolymers upon exposure to a precisely directed and focused actinic photon source of sufficient energy density. However, there are several key differences between heliolithography and stereolithography-based printing processes.

Heliolithography utilizes the best of "singular point" and "plane exposure" concepts discussed above to continuously solidify the building material, such as a photopolymer material, in thin lines by a spiral buildup. When these lines are oriented as radii in a build area, for example, in a circular-shaped build area revolving symmetrically around a single center point, then a continuous printing process can be performed in a helical fashion. The build platform (upon which solidified material is deposited to form the physical object) in one embodiment is continually rotated and simultaneously raised in a very gradual manner while the material to be solidified, such as a photopolymer is deposited as a liquid in a thin line on a transparent platform. A stationary line of focused actinic radiation delivered from a position below the platform is directed into the liquid photopolymer to produce a single continuous "layer" of the now solidified material deposited and bonded to adjacent previously or simultaneously deposited material in a helical fashion. Alternatively, heliography can also be implemented by slowly raising the build platform without rotation while a line of focused radiation "spins" beneath in a programmed manner, curing liquid photopolymer continuously. In a further embodiment, the platform can be periodically or continuously rotated and at the same time the actinic light can be periodically or continuously reposition during the buildup and curing process.

Methods and systems incorporating features of the present invention seek to solve the issue of having both simultaneously high construction resolutions while still preserving the ability to print large structural objects in a faster more economical way than can be achieved by the prior art. Such systems can utilize a continuous method for depositing and solidifying materials, for example, photocurable materials, in a rotational manner that results in a spiral build-up of material.

In some embodiments of an apparatus incorporating features of the present invention, a rotating build platform with an elevation that can be controlled along a Z-axis is utilized. This build platform is lowered onto at least one solidification area which comprises at least one material dispenser, at least one transparent substrate, for example, from which a material flows and is held against the build platform during solidification, at least one drainage system to remove unused material and at least one excess material stripper for collecting and removal and recycling of unsolidified materials. In a photopolymerization process, electromagnetic radiation emitted from a source below the transparent substrate, is directed onto the photocurable construction material in specifically targeted regions that coincide with point data derived from a three-dimensional object that is stored in the machines memory system.

In the use of photopolymers, both construction materials and irradiation sources are selected to provide a near instantaneous cure of the construction material. The solidified material adheres to the rotating build platform, resulting in the continuous or semi-continuous spiral build-up of material to construct an object substantially similar in appearance to a desired three-dimensional object. In utilizing these processes incorporating features of the present invention, vertical resolution of a constructible object can correspond to the layer height or layer pitch angle of a continuous spiral layer of material and can be controlled by altering the relative distance at which the inverted build platform is suspended above the photocurable material that is held on a transparent substrate.

These and other further embodiments, features and advantages of the invention would be apparent to those skilled in the art based on the following detailed description, taken together with the accompanying drawings, in which:

BRIEF DESCRIPTION OF THE DRAWINGS

FIG. 4 is a perspective view of an imaging component of a 3D printer incorporating features of the present invention;

FIG. 5 is a perspective view of a z-axis elevator stage of a 3D printer incorporating features of the present invention;

FIG. 10 is a partial internal perspective view of a base material storage and construction area of a 3D printer incorporating features of the present invention;

FIG. 11 is a perspective view of a complete solidification area of a 3D printer incorporating features of the present invention;

FIG. 12A depicts a single item being constructed radiating from the center of the build chamber floor of a 3D printer component incorporating features of the present invention;

FIG. 12B depicts multiple items under construction radiating from the center of the build chamber floor of a 3D printer incorporating features of the present invention;

DETAILED DESCRIPTION

Figure 1:
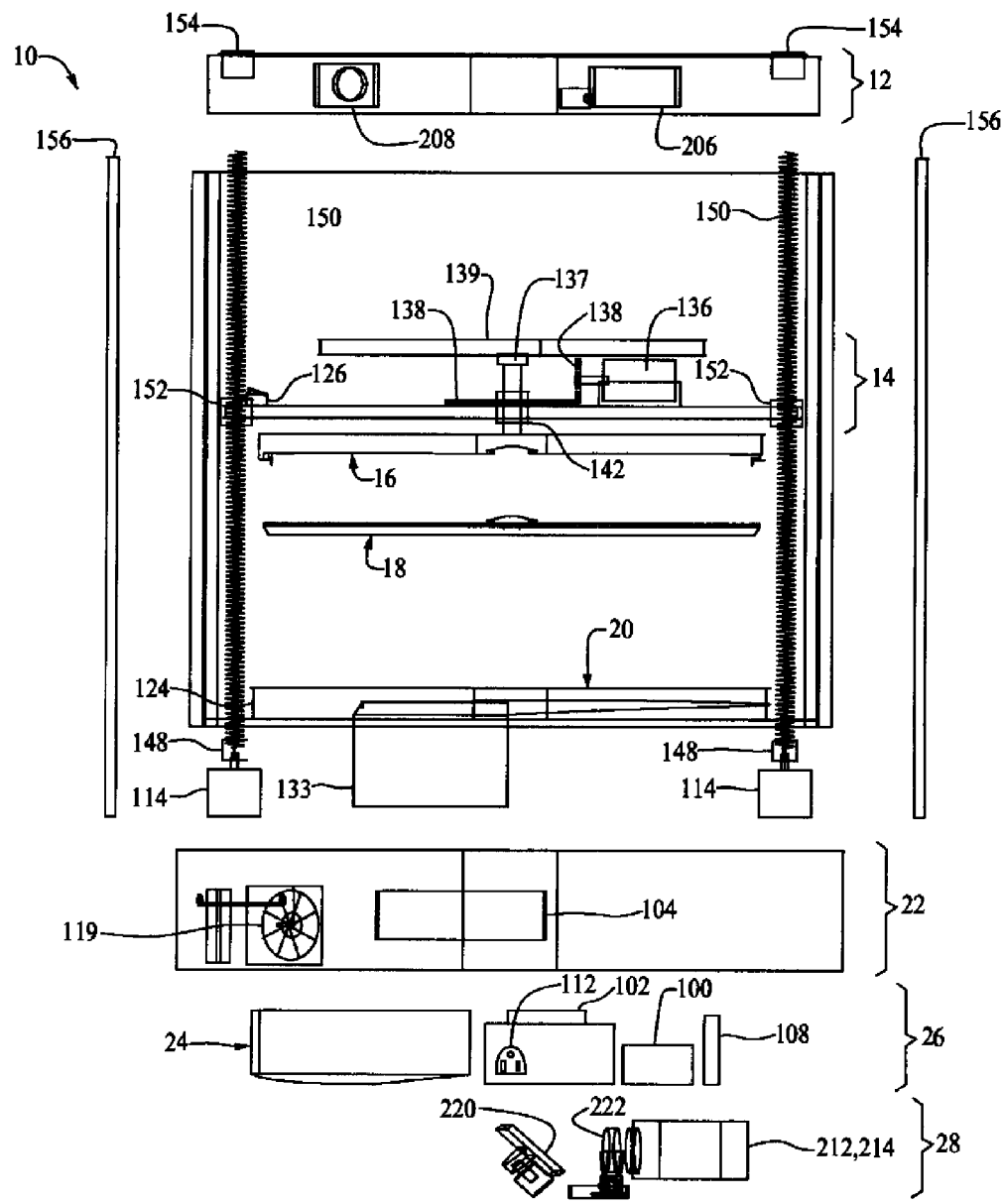
FIG. 1 is a cross-sectional exploded view of a 3D printer device incorporating features of the present invention.

The present disclosure sets forth methods and devices for efficient 3D printing that address conventional inefficiencies and deficiencies while utilizing a single compact device. As illustrative of such methods and 3D production devices, the dispensing of a photocurable substance onto transparent substrate, the selective curing and solidified of such materials and the retrieval of the solidified product is described. However, one skilled in the art, based on the teachings herein, will recognize that the apparatus and techniques described herein are not limited to the use of photopolymers along with the irradiation sources suitable to effect solidification, but can be readily adaptable to a broad range of flowable materials that can be rapidly solidified for the continuous formation of solid, three dimensional objects.

Throughout this disclosure, the preferred embodiments herein and examples illustrated are provided as exemplars, rather than as limitations on the scope of the present disclosure. As used herein, the terms "invention," "method," "system," "present method," "present system" or "present invention" refers to any one of the embodiments incorporating features of the invention described herein, and any equivalents. Furthermore, reference to various feature(s) of the "invention," "method," "system," "present method," "present system," or "present invention" throughout this document does not mean that all claimed embodiments or methods must include the referenced feature(s).

It is also understood that when an element or feature is referred to as being "on" or "adjacent" another element or feature, it can be directly on or adjacent the other element or feature or intervening elements or features that may also be present. Furthermore, relative terms such as "outer", "above", "lower", "below", and similar terms, may be used herein to describe a relationship of one feature to another. It is understood that these terms are intended to encompass different orientations in addition to the orientation depicted in the figures.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present invention. As used herein, the term "and/or" includes any and all combinations of one or more of the associated list items.

The terminology used herein is for the purpose of describing particular embodiments only and is not intended to be limiting of the invention. As used herein, the singular forms "a," "an," and "the" are intended to include the plural forms as well, unless the context clearly indicates otherwise. For example, when the present specification refers to "a" source of radiation or "a" material it is understood that this language, in the first instance, encompasses a single source or a plurality or array of radiation sources and, in the second instance, a single or multiple sources of materials. It will be further understood that the terms "comprises," "comprising," "includes" and/or "including when used herein, specify the presence of stated features, integers, steps, operations, elements, and/or components, but do not preclude the presence or addition of one or more other features, integers, steps, operations, elements, components, and/or groups thereof.

It should be further recognized that reference to "solid" 3D structures refers to the materials of construction becoming solid and that the 3D product produced is not necessarily a solid structure and may include products with unfilled or hollow spaces therein or, if intended, an open, porous or lattice-like structure and may in fact include spaces therein enclosing a liquid or non-solid filling material.

Figure 22:
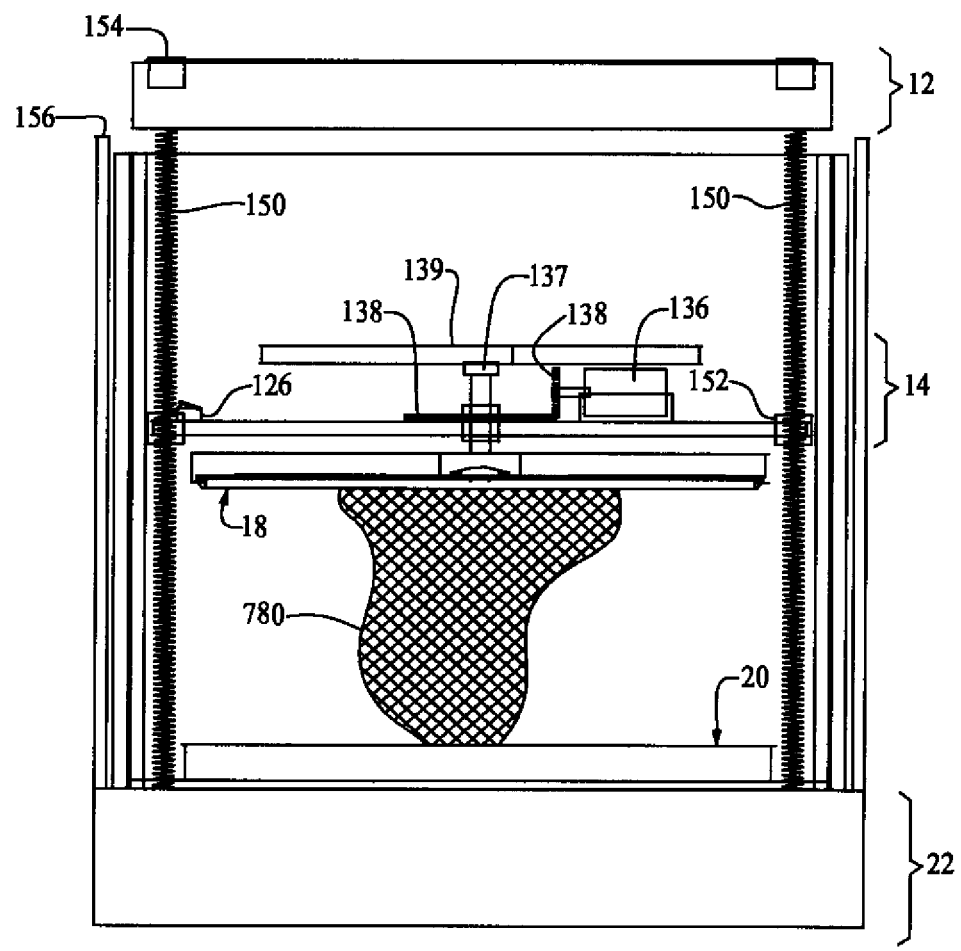
FIG. 22 is a side view of the 3D printer device of FIG. 1, with a 3D structure in the process of being printed.

For the purpose of describing the construction procedure, the term "inverted" or "inverted build" refers to the method and procedure of building a 3D structure which is suspended below a horizontal assembled build structure 16, 18 with a portion sometimes referred to as the "base" of the 3D structure attached to the build platform insert 18. The assembled build structure 16, 18 rises vertically from and above the construction/solidification area 20, as it prints a 3D structure 780 such as shown in FIG. 22.

In some embodiments, the basic essential functionality of the Heliolithography process can be carried out through the use of 3D model software files, which produces an image map that is sectionalized into a spiral or helical structures using computer assisted drawing (CAD)-type computer programs. The spiral structure can be converted into segmented images or bit data corresponding to points along the surface areas of the intended printed object that are to be solidified by the controllable projection of radiation onto exposed areas to selectively solidify the materials of construction.

The solidification method can utilize any build material capable of changing from a liquid or flowable state to a solid in response to a stimulus. For example, solidification can be the result of providing a radiative source which has the appropriate physical characteristics to cure or react the irradiated reactive liquid photopolymer material positioned on the rotating build platform. In some embodiments, the build material comprises a photopolymer solution containing at least one photoinitator. The photoinitator absorbs radiation at specific wavelengths producing free radicals which cause the rapid polymerization in the localized irradiated regions. Representative chemistries that can be used can comprise unsaturated polyesters, styrene-Polyenes, Thiols-Acrylates, and methacrylates-Cycloaliphatic epoxides. Alternatively, a second reactive material can be dispensed to cause a crosslinking of a primary polymer. Further, thermoplastics can be heated to liquefy and then rapidly cooled to solidify. As a still further alternative powdered metals or thermoplastics can be dispensed and "spot welded" use a heat source or laser beam.

A typical formulation for a photoreactive material used in such a process comprises one or more monomers (molecules of low weight that provide the specific desired properties and adhesion), Oligomers (medium length polymer chains that contribute additional properties such as increased tensile strength, stiffness, and elongation), photoinitiators (light sensitive materials that trigger free radical production to initiate the polymerization process), and additives such as fillers, pigments, dyes, adhesion promoters, abrasion resistant materials, UV light stabilizers and chemical stabilizers.

One example of a photopolymer formulation that can be used in the process described comprises a solution of monomer such as 1,6-Hexanediol ($HOCH_2(CH_2)_4CH_2OH$) and Polyethylene Glycol Diacrylate $(C_3H_3O).(C_2H_4O)_n.(C_3H_3O_2)$ with one or more photoinitators, phenylbis(2,4,6-trimethylbenzoyl)-phosphine oxide $[CH_3)3C_6H_2CO]2P(O)C_6H_5$ and Diphenyl(2,4,6 trimethyl benzoyl) phosphine oxide $(CH_3)3C_6H_2COP(O)(C_6H_5)_2$ at concentrations between 2 and 8 percent by weight.

Figure 2:
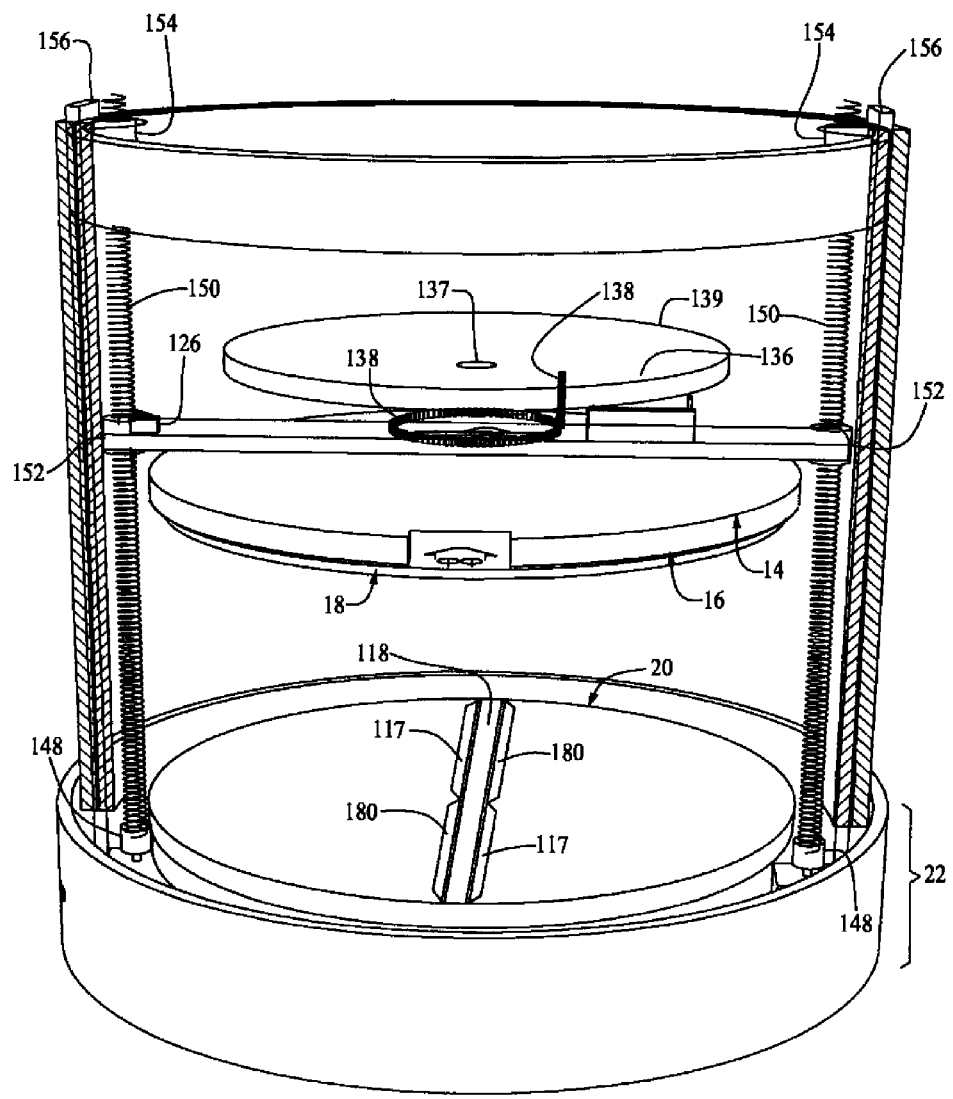
FIG. 2 is a front perspective view of the 3D printing device of FIG. 1 incorporating features of the present invention.

FIGS. 1-2 show a sectional and front perspective views respectively, of some of the major functional components of an example 3D printer 10 incorporating features of the present invention. The 3D printer 10 comprises an imaging unit 12, a z-axis elevator stage 14, also referred to as the construction frame, a build platform 16, and a build platform insert 18 which is configured to fit together with the build platform 16, to provide an assembled build platform (as shown in FIG. 2). Although the present disclosure sets forth a configuration utilizing both a build platform 16 and a build platform insert 18, it is understood that the use of the methods and devices incorporating features of the present invention can utilize the build platform 16 alone without the build platform insert 18. Below the assembled build platform 16, 18 is a construction/solidification area 20, a material storage area 22, a material cartridge/reservoir 24, electronic components 26, and a solidification mechanism 28. These components and their various sub components are discussed in greater detail throughout the present disclosure.

With reference to FIGS. 1 and 2, a 3D file (corresponding to a desired 3D object to be produced (the "print task")) is loaded into the memory of a print processor 100, which is configured to operate in conjunction with a CPU and solid state memory storage, to control the 3D printer 10. This print task can be transferred through the CPU and into solid state storage in a variety of ways know in the art. For example, it can be transferred from a remote server or program using internet protocol (through its Ethernet or WiFi connection 102), or it can be loaded manually by the user using a control interface 104 and/or universal serial bus (USB) data transfer ports. Control interface 104 can be any control interface known in the art. In the embodiment shown, control interface 104 is a touch screen interface, such as an LCD touch screen interface. The data can be uploaded to the apparatus which performs self-tests and priming functions to ready the machine for printing. Motor drivers 108, work in conjunction with the print processor by receiving low-voltage signals from the print processor 100 and generating controlled current signals needed to properly drive the various motors used throughout the printer. Other electronics within the electronics component assembly 26 of the 3D printer 10 include a power supply 112, which can transform voltage input to provide regulated power to all the components of the electronic component assembly 26. It is understood that while the power supply 112 is depicted as comprising an outlet, any suitable power supply know in the art, for example, battery- or generator-based power supplies, are within the scope of the present disclosure.

The printer comprises a build platform 16 and a construction area 20. Build platform 16 can be permanently installed or replaceable, e.g. being removable connected to z-axis elevator stage 14. The build platform 16 can be rotatable clockwise and/or counterclockwise or otherwise moveable in one or more directions and can have a variety of shapes including any regular or irregular polygon or can be circular or substantially circular. The build platform 16 can be lowered towards the solidification area 20 using z-axis stepper motors 114; a sensor 124 can be used to determine when the desired layer-height of an object to be produced has been reached. The printer will then begin the print cycle by first ensuring all moveable axes are in the correct starting position. For the z-axis, the starting position is typically one layer height above the cure zone (above the home position). However, it is understood that other starting positions can be designated as needed for a particular print task and/or as newer technology becomes available and is incorporated into devices and methods according to the present invention. For the rotation axis, the starting position is the same as the home position.

The homing process, which establishes the '0', or start position of each axis, uses sensors 124, such as hall effect sensors, in a closed-feedback system to determine the hard limits of each axis. Hall effect sensors are known in the art and typically comprise a transducer that varies its output voltage in response to a magnetic field. Hard limits for each axis can be driven from a pair of linear sensors, such as hall effect proximity sensors 124, positioned at each limit. When utilizing hall effect sensors, one or more small magnets 126 can be embedded in the moveable z-axis carriage 14.

Because the sensors have a linear analog output directly proportional to magnetic flux, each sensor can be calibrated with its own trigger voltage.

Once hard limits are determined, printer firmware maintains in its memory the current position of each axis relative to its home position. When the printer is powered on, it can be programmed to re-home each axis before accepting new print tasks, for example, to compensate for situations wherein an axis has been moved while the printer was powered off. The current position of each axis can be stored as an integer number of motor steps from zero. In these configurations, moving the axis "up" will increase this internal counter, and moving the axis downwards will decrease the counter.

Soft limits can also be put in place to configure the printer such that the printer will never allow a motor movement that will send the axis below the lowest position or past the maximum allowed value, which is specific to each axis' length. If an axis is directed to exceed these preset limits the printer controller will halt the print task and issue an appropriate error message. Also, if there is ever a programming error and the printer attempts to move past the soft limit, the hard limits built into each axis will halt the axis movement and the print task before any damage to the printer occurs, requiring entry of an appropriate soft reset.

The material storage area 22 can hold a replaceable material cartridge 24. The material cartridge contains electronically stored information which can be read by the 3D printer 10 to determine the amount of material in the cartridge 24 and other specifics about the material in the cartridge. An agitator mechanism, such as a magnetic stirring device 230, as shown in FIG. 10, can also be included and be located below the cartridge 24 to ensure materials are uniformly mixed prior to dispensing. One or more atmospheric control mechanisms 119, such as an electronic heating mechanism and/or a fan and/or humidifying control systems can also be used to alter the temperature of construction material in the material cartridge 24 or control the exposure to moisture if needed, for example, to reach a desired viscosity or reduce detrimental moisture prior to dispensing. A thermal sensor and/or humidity sensor can also be used to monitor when a desired material temperature is reached or that no excess moisture is present.

Referring to FIG. 10 a material pump 115 can be used to move photocurable build materials, such as liquid-state photocurable materials, from the material reservoir 24 to a material depositor. At least a minimal amount of material needed for a proper thickness coating on the build surface can then be dispensed. A material such as photopolymer resin can be introduced to the print area by the printer's internal plumbing system, driven by a small pump. With reference to FIG. 1, as resin is introduced, it flows down resin supply channels in a print head and flows over the cure zone and into resin return channels 117. Excess liquid resin is continuously pulled from the resin return channels 117, filtered and returned to the resin tank or discarded, if appropriate.

The assembled build platform 16, 18 can then be rotated, which spreads liquid resin over the solidification area, depositing and evenly spreading the photopolymer to a desired layer thickness. In some embodiments, the desired thickness is between 0.001 and 0.1 mm in thickness. A secondary material dispenser can optionally be used to infuse the primary material with additional additives, pigments, dyes, coloring agents into the primary photopolymer prior for curing. In an alternative embodiment, the secondary material can be a material reactive with the first material to effect solidification. It is understood that while the embodiments described herein set forth a rotatable build platform and stationary material dispensers and solidification areas, the reverse configuration would also work and be within the scope of the present application, wherein material dispensers and solidification areas rotate under a stationary build platform. In an alternative embodiment, the material dispenser, solidification and build platform can be simultaneously or alternatively moved in a programmed manner.

Once a continuous resin flow is established, the assembled build platform 16, 18 begins to rotate before the solidification process begins to establish a uniform flow of material across a material spreader. The rotation of the assembled build platform 16, 18 is performed with the use of a variable speed motor 136 that drives a central shaft 137 with engaged 90 degree gears 138 that rotate both the scanner and assembled build platform 16, 18 that are suspended on one or more bearings 142 connected to the z-stage 14. The build platform can be set to spin for set number of rotations, also known as the "spin-up" period. The rotation of the assembled build platform 16, 18 helps to draw new material over the cure zone and ensures that no air is trapped. Without pausing rotation, the printer begins the printing process by activating the solidification mechanism to begin the photo-cure process.

Continued rotation of the build surface (or movement of the feed mechanisms or other components programmed to move) advances the print materials onto an across an exposure/cure zone 118, which is preferably glass or another sturdy, transparent and preferably low adhesion medium. The exposure zone 118 can be treated with a non-stick and abrasion resistant coating, which prevents or retards cured material from adhering to its surface. Selective solidification of the segment of material deposited between the build platform and the transparent construction surface, is carried out by one of a number of possible combinations of radiation sources and radiation directing mechanisms used to direct the radiation through the transparent substrate portion of the solidification area onto and into the liquid construction materials. Material level sensors in the material cartridge 24 are also used to monitor material levels and are capable of pausing or slowing a print cycle if material levels become critically low.

The data stored in the memory of the printer is transmitted to the solidification mechanisms 28 in a programmed manner to selectively expose portions of the photopolymers through the transparent substrate, solidified in a manner corresponding to the structural information relating to specific segments of the 3D model which is being constructed. The Heliolithography process, which appears to be continuous can actually comprise many small cumulative "steps" for each full rotation of the build platform, pausing at each step for a small amount of time, typically between 5-10 milliseconds required to allow the polymerization reaction to progress past a critical "degree of cure" (i.e., a level of solidification) needed to sufficiently attach to the build platform insert 18 and firmly adjacent previously solidified portions of structure being formed. As an alternative the build platform insert 18 can comprise a removable retention means added to the lower surface thereof which can be incorporated onto the first layers of the product being built so as to allow removable attachments of that structure, once completed, from the build platform insert. In some embodiments, referring to FIG. 8, the holes can be shaped to add alternative retention structures 770 such as inverted cones or additional structures 770 can be added to provide further retention of the structure being built. Unsolidified material is simultaneously removed and recycled back into the reservoir.

As the portion of the structure being built is sufficiently solidified, the rotating assembled build platform 16, 18 continuously removes the solidified material from the exposure zone 118 and provides new construction material spreading across the construction area 20. Solidified material is also, at the same time, rotated towards a recycling area comprising a drain 132, such as an excess materials stripper, that removes any unsolidified materials from the growing structure which are then filtered and recycled back into the construction materials reservoir 24, and a further curing mechanism 133, if necessary.

As each additional step of the build process is reached, new information is provided to the curing mechanism 133, so as to solidify the resin where and when needed. As the assembled build platform 16, 18 rotates, it is continually raised by the linear actuators in a ratio such that the assembled platform 16, 18 is raised one layer height for each revolution. In some embodiments, one layer height corresponds to the number of radii of an intended curing piece of the structure. For example, in embodiments utilizing one material while curing down the diameter (i.e. 2 radii) a full layer would be cured during every 180 degree rotation of the build platform. In some embodiments utilizing multiple cure areas, but still utilizing a single material, a single layer can be cured faster with less rotation, for example, at approximately 360 degrees/number of cure radii. The linear actuators include stepper motors 146 that are coupled via coupling devices 148 to fasteners, such as lead screws 150, so as to raise the z-stage which is connected with fastener acceptor, such as a lead screw nut 152, when rotated. Bearings 154 and linear guide rails 156 mounted in the z-stage 14 stabilize this vertical movement.

This cycle is repeated until the spirally deposited and solidified material is built up and the constructed three-dimensional object suspended below the assembled build platform 16, 18 but above the construction/solidification surface 20 is completed. This process is repeated in a continuous fashion until, cumulatively, the total height of the printed object has been reached. Once this is accomplished and the cure mechanism has no remaining information in its input buffer, the curing mechanism (the photon source) is shut off and the rotation of the build platform is stopped. The resin flow is shut off and all remaining liquid resin drains back into the material cartridge. The machine initiates a motion sequence raising the build platform to its upper soft limit and brings the rotation of the platform to its homed '0' position.

In addition to utilizing preexisting software print modules, methods and devices incorporating features of the present invention can also utilize scanning and other imaging units. In some embodiments, objects can be placed on a scanner platform 139 and the printer 10 can be instructed to begin scanning. The z-stage 14 raises the object to an initial height to begin a scan. A pattern imaging device 206, such as a projector, or laser can be used to project a known geometric pattern on the surface of the object. A recording device 208 can then record the distortions to this known geometric pattern as the scanner platform 139 rotates driven by the same variable speed motor 136 and drive gears 138 as the build platform. The height of the object can be raised or lowered using the linear actuators to perform subsequent passes to generate greater coverage of the object geometry to include under cuts and over hangs. This information is then sent to the processor 100 and transmitted via Ethernet, WiFi or wired connection 102 to a computer or cloud system for the reconstruction of the scanned object.

Many different solidification mechanisms can be utilized with methods and devices according to the present disclosure. A solidification mechanism 28 used in the device of FIG. 1 can include any radiation source such as high power diodes 212, 214, with the radiation directed through correcting and focusing optics 222 and onto a motor controlled mirror scanning system 220 for directing the radiation through the exposure zone 118 of the cure zone. Other solidification mechanisms are discussed further below.

Figure 3:
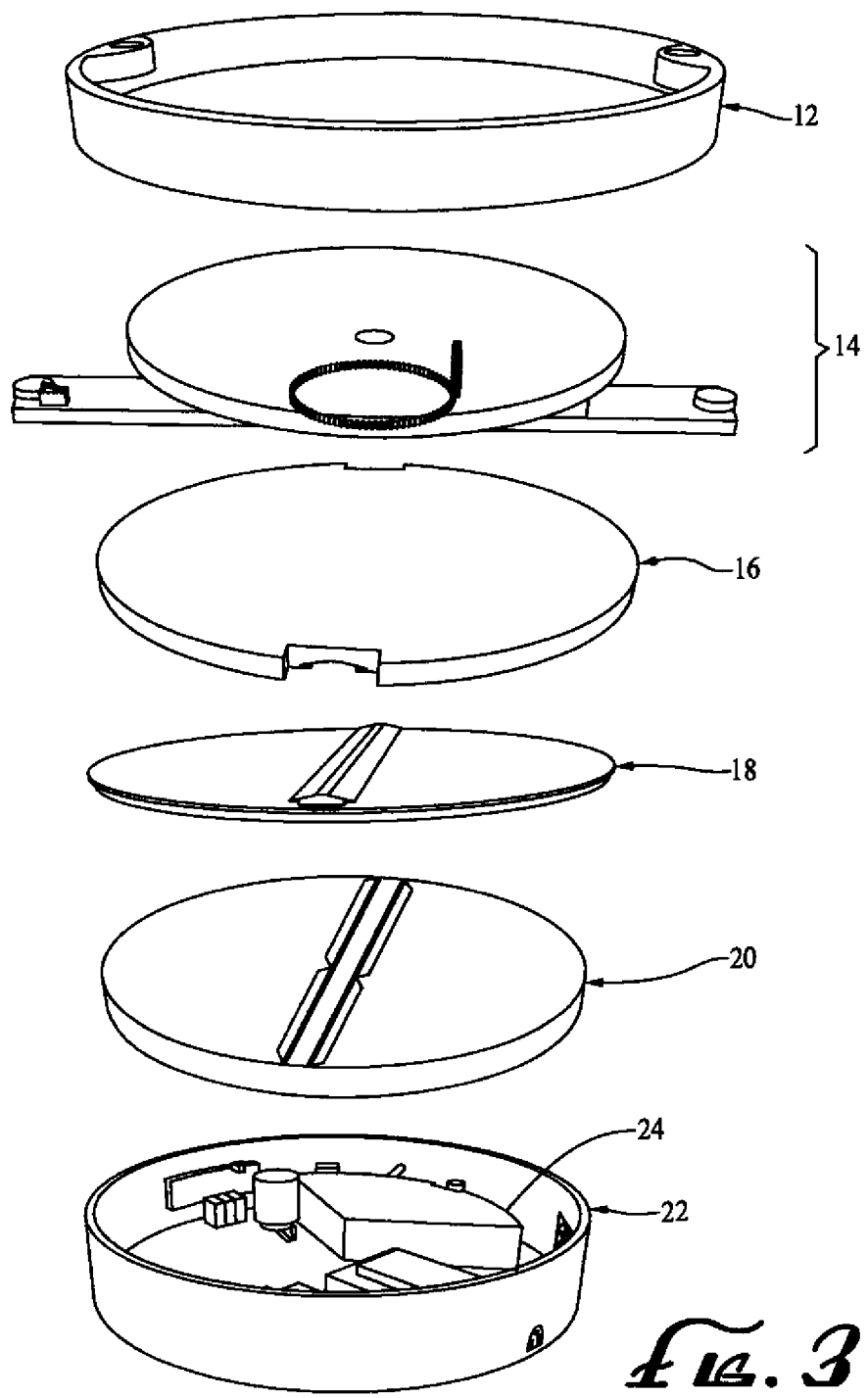
FIG. 3 is a cross-sectional exploded view of components of a 3D printer device incorporating features of the present invention.

FIG. 3 shows an exploded view of an imaging unit 12, a z-axis elevator stage 14, a build platform 16, a build platform insert 18 which is configured to fit together with the build platform 16 to form an assembled build platform 16, 18 (as shown in FIG. 2), a construction/solidification area 20, a material storage area 22, and a material cartridge/reservoir 24. FIG. 3 shows these components aligned in correct configuration according to some embodiments incorporating features of the present invention, such as the embodiment 10 depicted in FIGS. 1-2 of the present application. FIG. 4 shows an enlarged view of the imaging unit 12, which comprises a pattern imaging device 206 and a recording device 208 as discussed above. The imaging unit 12 can be connected to z-axis elevator stage 14 via bearings 154 as shown in FIG. 1.

FIG. 5 shows a more detailed view of z-axis elevator stage 14, which comprises magnets 126, which can interact with hall effect sensors to relay the position of the z-axis stage 14, a variable speed motor 136 that drives a central shaft 137 with engaged 90 degree gears 138, a scanner platform 139 and fastener acceptors 152. These components can function as set forth above.

Figure 6:
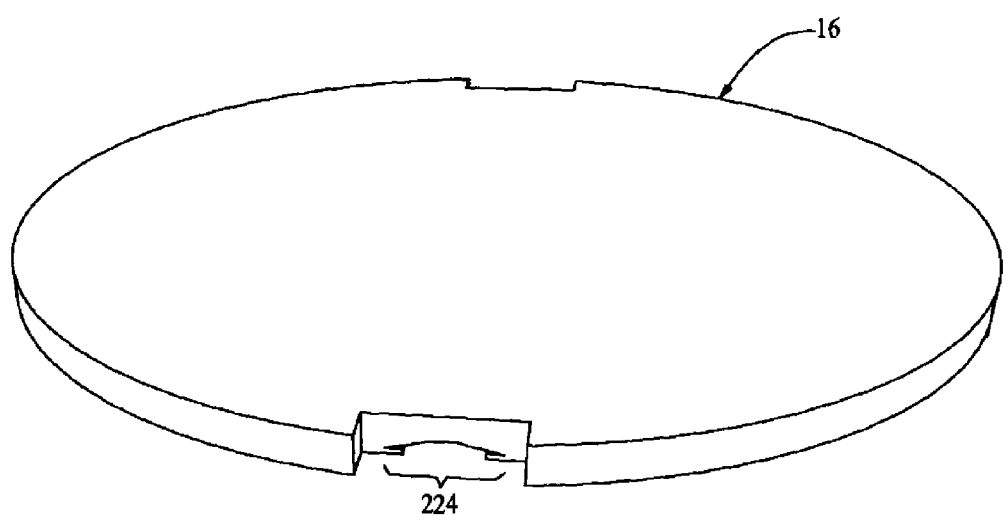
FIG. 6 is a perspective view of a build platform attachment plate for a 3D printer incorporating features of the present invention.
Figure 7:
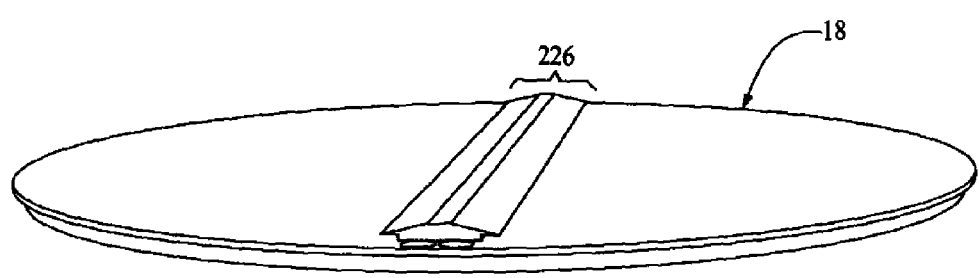
FIG. 7 is a perspective view of a removable build platform insert for a 3D printer incorporating features of the present invention.
Figure 8:
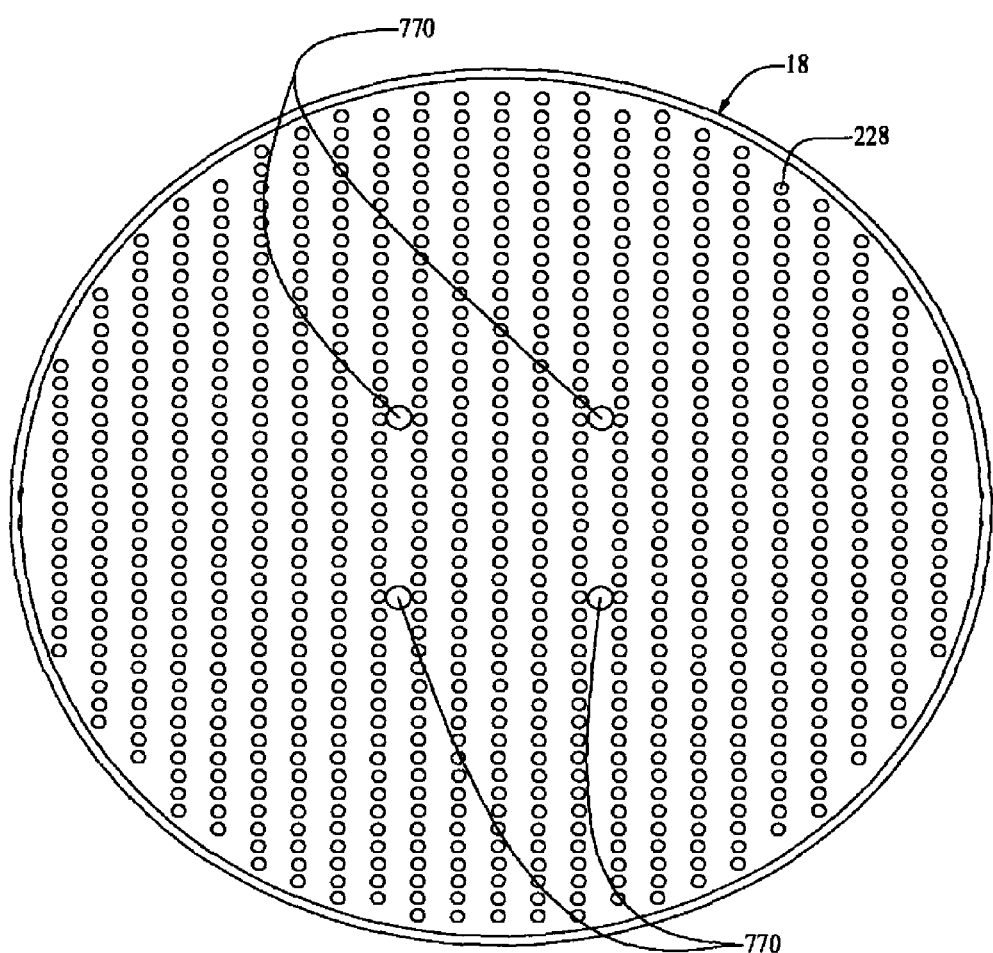
FIG. 8 is a bottom view of a removable build platform insert for a 3D printer incorporating features of the present invention.

FIG. 6 shows an enlarged view of the build platform 16. One aspect more clearly shown in FIG. 6 is the insert accepting portion 224. FIG. 7 shows the build platform insert 18 and the inset connecting portion 226. The insert accepting portion 224 of the build platform 16 as shown in FIG. 6 can be configured to interact or mate with the inset connecting portion 226 of build platform insert 18 shown in FIG. 7 such that the two components can be connected into an assembled build platform 16, 18 (as shown in FIG. 2, for example). This allows the build platform insert 18 to be readily removed and replaced in the device. FIG. 8 shows a bottom view of the build platform insert 18 comprising arrays of holes 228 allowing increased surface area for building materials. The removable build platform insert 18 or a removable attachment to the build platform insert 18 can be separated from the complete product or remain as a piece of the complete product.

Figure 9:
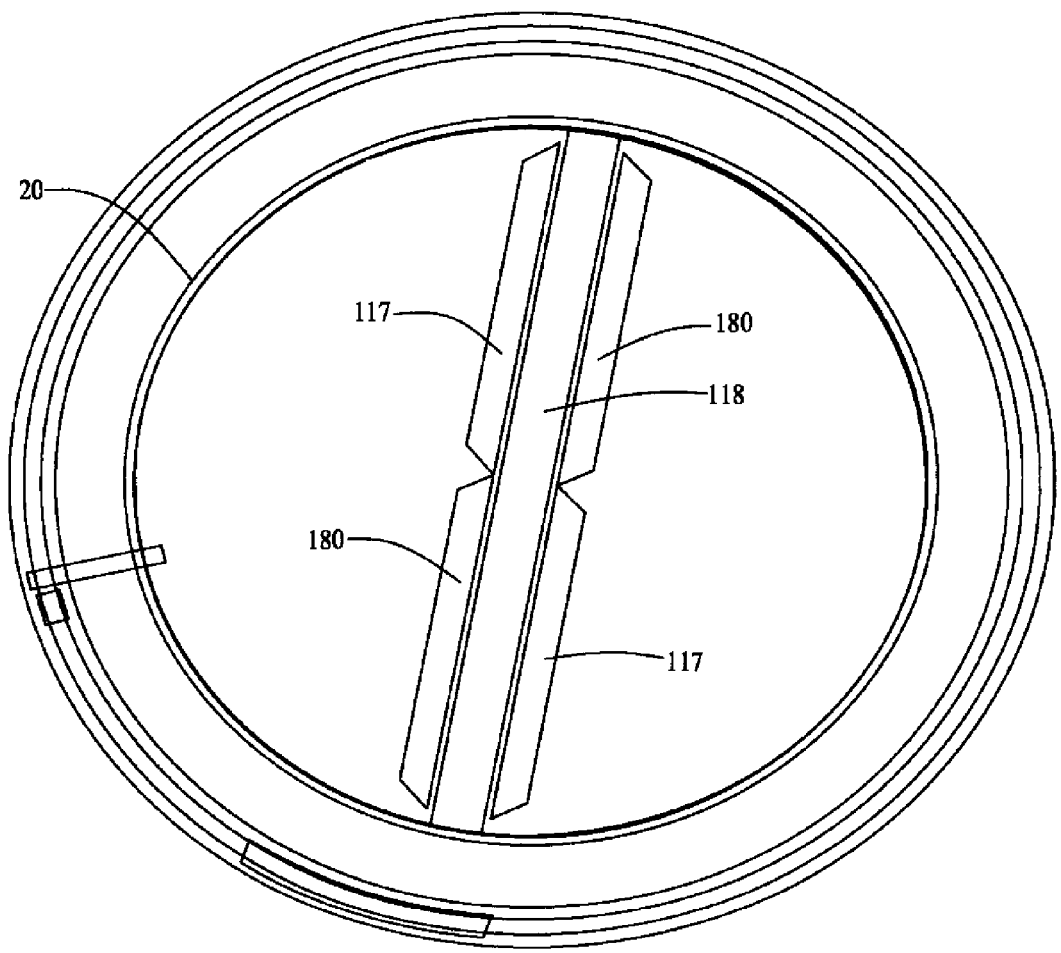
FIG. 9 is a top view of a view of an expanded solidification area/vat for a 3D printer incorporating features of the present invention.

FIG. 9 shows an enlarged view of the construction/solidification area 20, comprising a primary material dispenser 180, a cure zone 118, resin return channels 117, a material spreader 182, and a curing mechanism 133, such as an excess materials stripper, these components functioning as set forth above.

FIG. 10 shows an enlarged top perspective view of the material storage area 22 and the material cartridge reservoir 24. Also shown in FIG. 10 are the control interface 104, a material pump 115, resin return channels 117, an exposure/cure zone 118, which is a transparent substrate, an atmospheric control mechanisms 119, curing mechanisms 133, a coupling devices 148 attached to fasteners 150, linear guide rails 156 within the coupling devices, a primary material dispenser 180, a material spreader 182, a secondary material dispenser 184 and a magnetic stirring device 230. FIG. 10 also shows additive material cartridges 186 which can be configured to feed secondary material through primary material dispenser 180 and/or a secondary material dispenser 184.

FIG. 11 shows a condensed perspective view of a construction zone 720, comprising primary material dispenser 180, a material spreader 182, a secondary material dispenser 184, an exposure/cure zone 118, which is a transparent substrate, resin return channels 117 and curing mechanisms 133. The same structures are shown in FIG. 12A which shows a single construction zone 720 radiating from the center of the floor of the build chamber 21. FIG. 12A also shows an additive material cartridge structure 186. FIG. 12B shows an alternate configuration, wherein multiple construction zones 720 and additive material cartridge structures 186 radiate from the center of the floor of the build chamber 21.

Figure 13B:
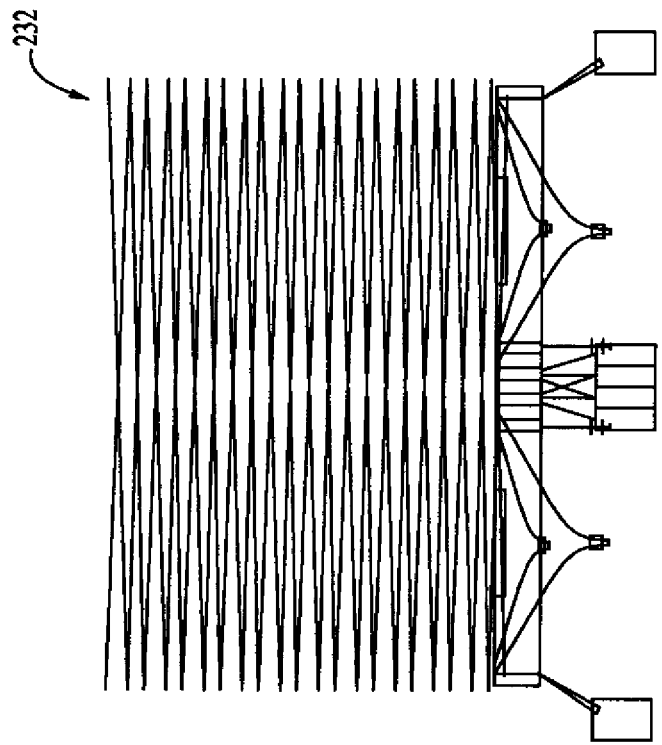
FIG. 13B is a side view a continuous spiral layer construction buildup utilizing multiple construction areas of a 3D printer incorporating features of the present invention.
Figure 13A:
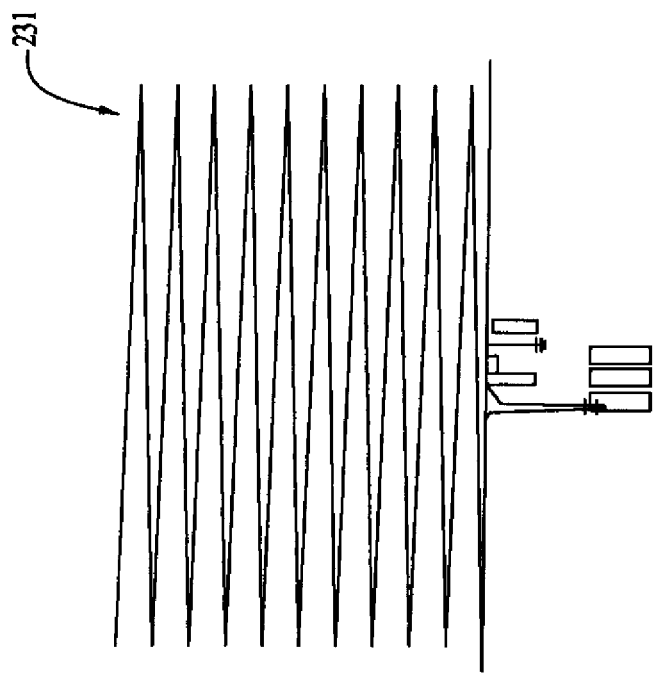
FIG. 13A is a side view of a continuous spiral layer construction utilizing a single construction buildup area of a 3D printer incorporating features of the present invention.

For illustrative purposes, FIGS. 13A and 13B are side views of a spiral layer printing construction for a single construction area 231 and for multiple construction areas 232, respectively. The use of multiple construction areas further provides the benefits of simultaneous layer creation or the expanded ability for a greater range of construction material options wherein each construction area can dispense and solidify a unique range of materials into a single layer. For depositing into a single construction layer the subsequent heights of the construction substrates can also match the pitch of the spiral layer to be created and insure consistent layer thickness at each construction area. However, this is not necessary to achieve the desired color accuracy. This process can also be utilized wherein the build platform is rotated but raised only after one complete rotation is accomplished. This is of particular value where multiple construction areas of the same height are used. In such instance a consistent layer height for each material segment can be efficiently achieved. In actual operation the depicted expanded spiral can never occur as proper solidification techniques adhere and solidify together adjacent subsequent layers of the spiral laydown as they are formed.

Figure 14:
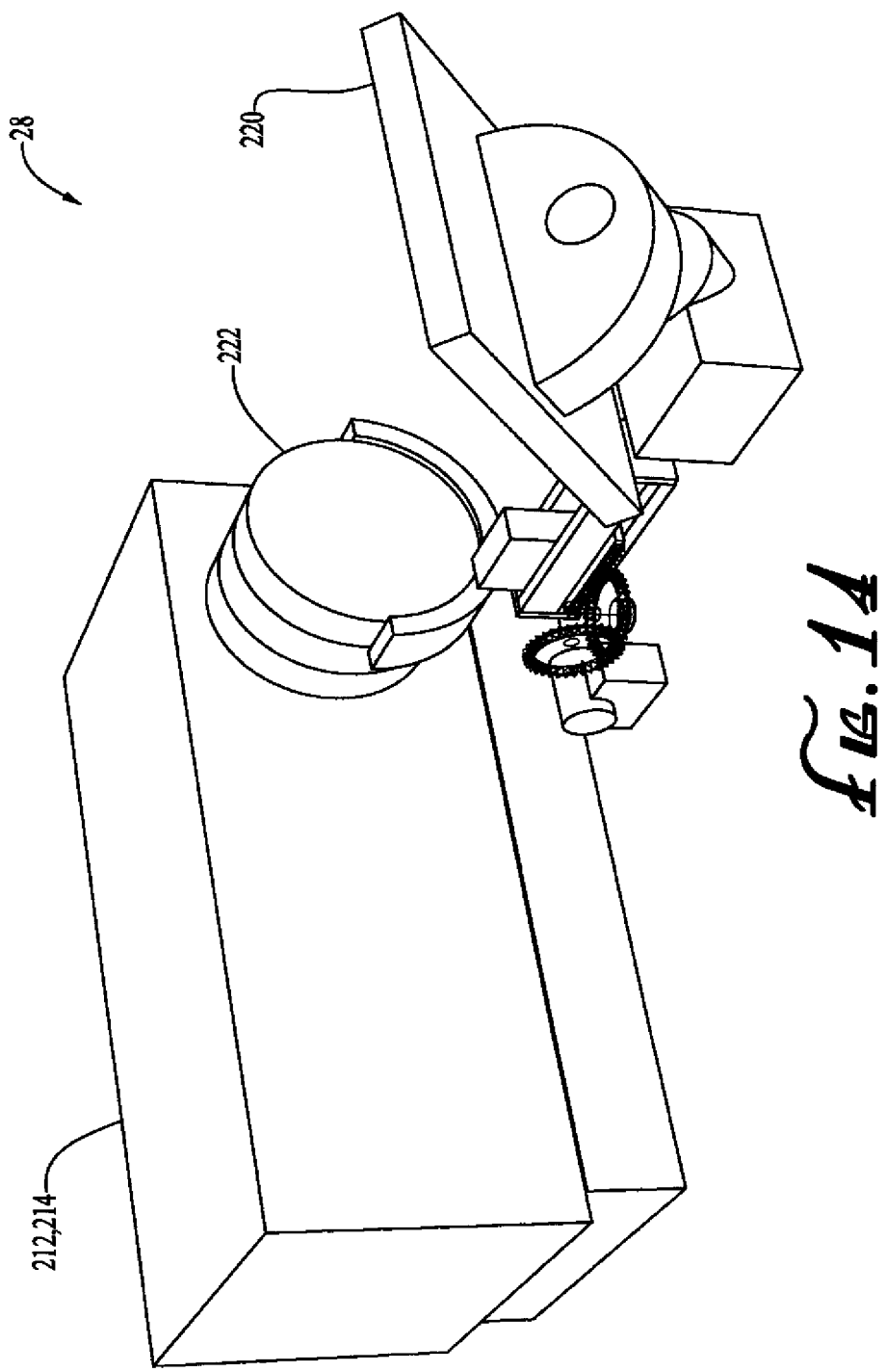
FIG. 14 is a perspective view of a radiation source for a 3D printer component incorporating features of the present invention.

Various solidification mechanisms and radiative sources can be utilized with devices and methods incorporating features of the present invention. FIG. 14 shows the solidification mechanism 28 of FIG. 1. When a photopolymer is used solidification mechanisms 28 can include various radiation sources such as high power diodes, LEDs or lasers 212, 214. In a particular embodiment the radiation is directed through correcting and focusing optics 222 and onto a controlled scanning mirror system 220 adapted to scan the incident light such as by use of a motor drive for directing the radiation through the exposure zone 118. The solidification mechanisms 28 can further incorporate a DMD Chip Micro mirror device (not shown).

Figure 15:
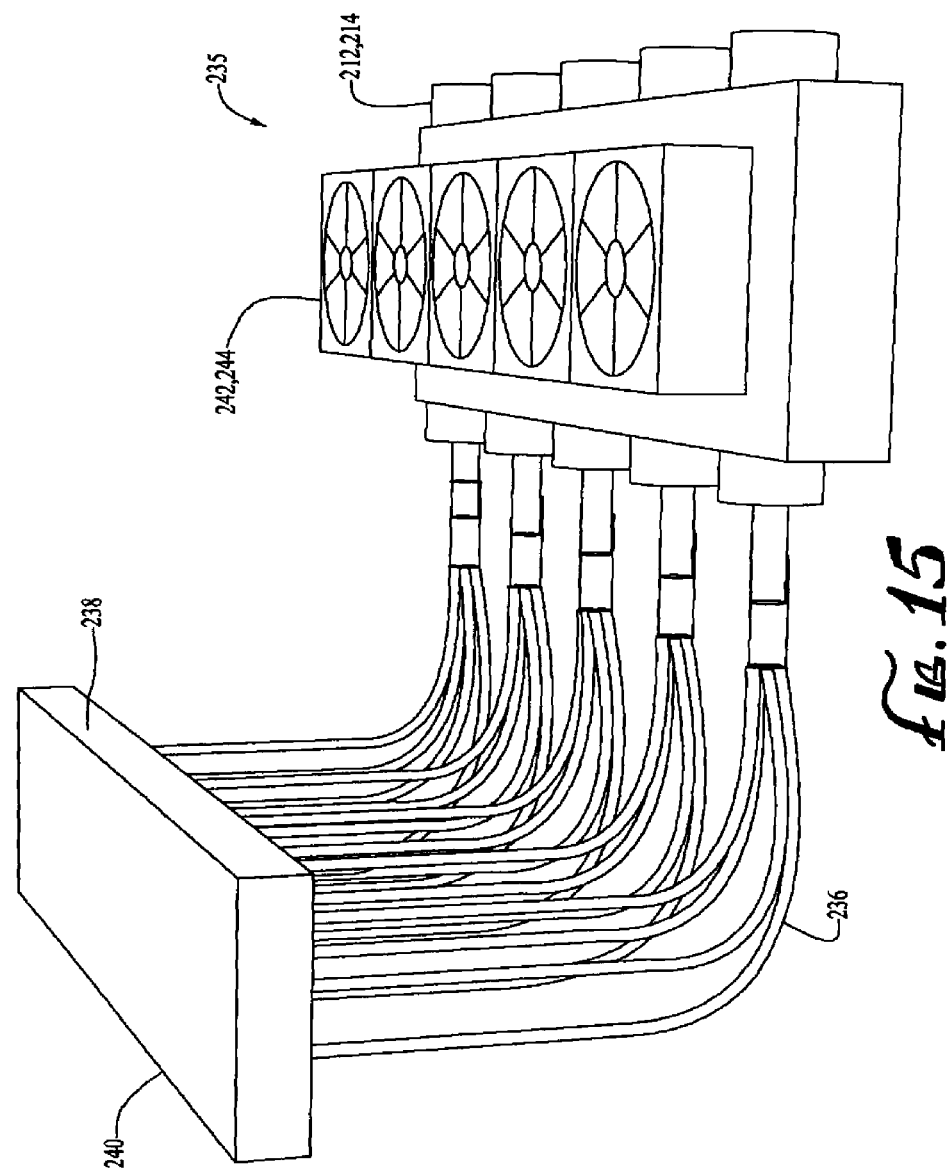
FIG. 15 is a perspective view of an alternative radiation source for a 3D printer incorporating features of the present invention.

FIG. 15 depicts a solidification mechanism 235 utilizing a Microelectromechanical systems (MEMS) or light valve switches. Depicted are high power diodes 212, 214, similar to the diodes that can be utilized with solidification mechanisms 28 described above, coupled to light/wave guides 236 in an optics system 238 for focusing onto a light switch 240 assembly. The light switch 240 is a mechanism allowing radiation to pass through at desired locations arranged in an overlapping hexagonal grid system. Fans and heat sinks 242 and a TEC temperature control system 244 can also be utilized for temperature control.

Figure 16:
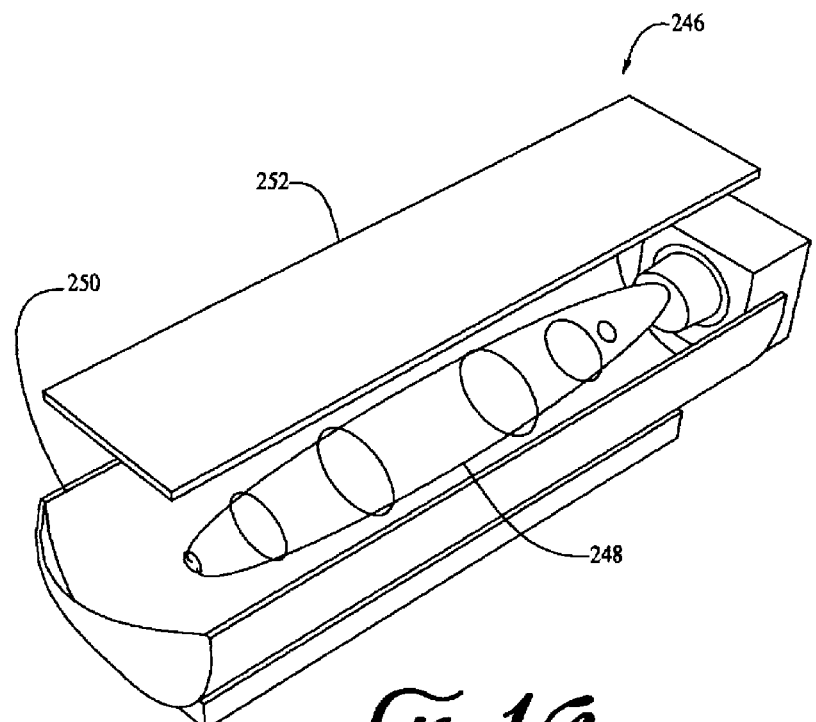
FIG. 16 is an expanded perspective view of another radiation source for a 3D printer incorporating features of the present invention.

FIG. 16 shows an alternative solidification mechanism comprising a board radiation source 246 such as an ultra-high performance (UHP) Mercury Vapor lamp 248. This mechanism uses a convex reflector 250 for focusing the radiation from the source 246 towards a digital mask 252 such as a LCD screen. The digital mask controls radiation passing through according to a pixel matrix programmed to block or transmit the radiation flowing there through.

Figure 17:
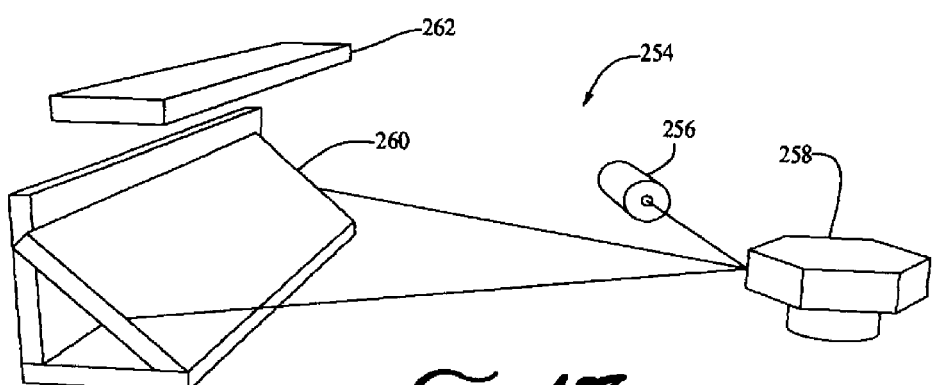
FIG. 17 is a perspective view of a fourth radiation source for a 3D printer incorporating features of the present invention.

FIG. 17 is a further alternative solidification mechanism using a radiation source 254 comprising a high power diode 246 and a motor controlled mirror, such as a polygonal multi-sided mirror 258. The mirror is rotated in relation to the diode, or vice versa, to scan the radiation in a linear direction corresponding to its angle of rotation. A 45 degree secondary mirror 260 is used to reflect the radiation towards an exposure zone such as the transparent substrate of the cure zone 118. This secondary mirror 260 can be motor controlled to provide a second dimension of scanning. An optics system 262 is also used to correct for distortions and scanning angles. In some embodiments, an F-theta optic system is utilized.

Figure 18:
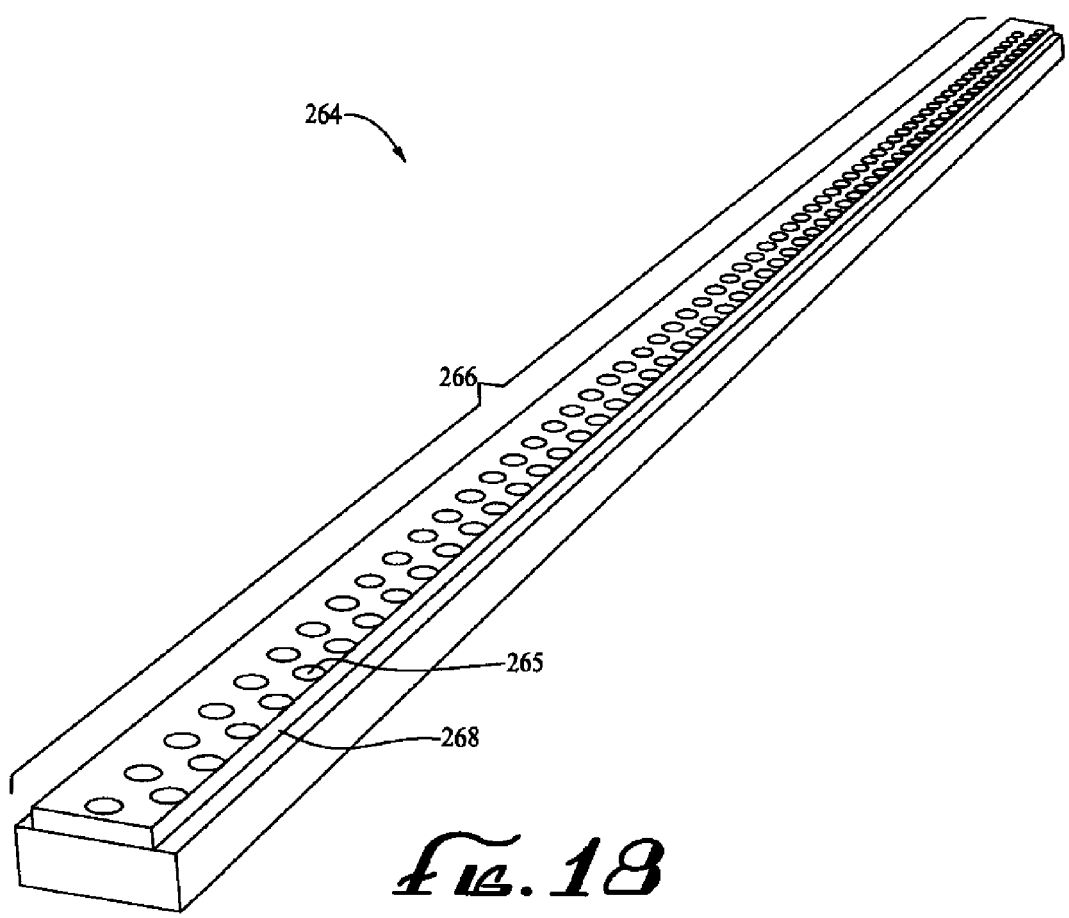
FIG. 18 is a perspective view of a fifth radiation source for a 3D printer incorporating features of the present invention.

FIG. 18 shows further alternative solidification mechanism 264 comprising an array of individually addressable diodes 265 such as a micro-LED array 266, that can be used independently to control the solidification of the construction material. An optic system 268 can also be used to focus the radiation to a desired point size between 5 and 50 nm.

A still further alternative can be to use one or more laser beams, which may or may not require focusing mirrors, as the laser beams can be individually positioned or repositioned as necessary to deliver narrow, pin point beams of controlled frequency light to specific target locations.

With reference to FIG. 22 a specific product is constructed utilizing devices incorporating features of the invention. Using the scanning techniques described above, the dimensional features and surface characteristics of a three dimensional object measuring about less than about 10.5 inches in diameter and less than about 9.25 inches tall were scanned and the scanned data relating thereto was stored in the memory of a 3D build system such as shown in FIGS. 1-2. A photo photopolymer, preferably an acrylate methacrylate resin comprising 2-8% of a combination of diphenyl (2,4,6 trimethyl benzoyl) phosphine oxide, Thermoplastic Polyolefin (TPO), and/or Phenylbis (2,4,6-trimethylbenzoyl) phosphine oxide, was added to the material storage area 22. A light source suitable to effectively cure the photopolymer within 3-10 cc/sec comprising an array of micro LED (365-385 nm) to provide irradiation of the polymer over at least about 10.5" width or diameter (approximately 200-300 watts/cm$^2$).

The polymer was metered at a rate of about 3-10 cc per second which is dependent on the dimensions of the object being built distributed onto a 12 inch diameter construction area (cure surface) with a transparent exposure zone, which can be a smaller portion of the construction area, for example, a 1 inch wide portion that is transparent to a certain type of radiation, such as UV radiation, which can be made of glass. This exposure zone had been previously treated with a low adhesion material such as Fluorinated ethylene propylene (FEP) and/or Polytetrafluoroethylene (PTFE), know commercially as Teflon®, to retard or prevent adhesion of the cured polymer to the cure surface. The resultant liquid polymer film was about 20-100 microns thick. The rotation rate of the built platform is primarily dependent on size and density of the product being built and the solidification rate of the material of construction, which in turn is dependent on the intensity and frequency of the irradiation source. The platform was rotated at a rate of 2-12 rpm.

The speed of construction can be enhanced by use of multiple cure areas and multiple feeds. However, construction of a structure is dependent on the size of the structure and the thickness of build material that can be cured per exposure. A general equation for estimating build speed is as follows:

$$\text{Build Speed} = \frac{1}{(RPM * \text{Number of Radii})} \times \frac{\text{TOTAL HEIGHT}}{\text{LAYER HEIGHT}}$$

Accordingly, for a structure with an intended height of 9 inches (228.9 millimeters) with a layer height of 50 microns (0.05 millimeters), a rotation speed of 5 RPM and a single cure zone, a build time is estimated to be approximately 915.60 minutes, which is approximately 15.26 hours ([1/5] *[228.9/0.05]). However, with four cure zones such as shown in FIG. 12B the build time is cut to 25% (approximately 3.8 hours). Depending on the build material additional cure zones can be added to further reduce the build time.

The method described herein of rotating the build platform allows for a larger surface area to be exposed to the electromagnetic radiation used to solidify the deposited photocurable materials resulting in constructing of objects that are larger than the physical dimensions of individual solidification areas, thus allowing the construction of larger objects. By utilizing a small area for solidification, higher resolutions and power densities can be attained by concentrating the number of solidification points to a smaller and denser region, which through rotation, can irradiate entire portions of the build area. This reduced solidification area also results in a greater concentration of radiation to targeted areas which helps to provide a close to instantaneous cure of construction materials, yielding faster construction of an object.

The method of curing or otherwise solidifying material between a build platform and another substrate yields greater layer height uniformity, accuracy and consistency. This method also helps prevent errors during layer creation that can result from external factors such as vibration that might have otherwise disturbed materials that were not held in place between two substrates. This translates to greater reliability of the machine with particular benefits in constructing small, ultra high resolution, components so that they can be prevented from being deformed or distorted by internal or external disturbances on the 3D build device.

The problem of part delamination seen in many prior 3D build systems can be caused by forming successive individual layers of material which are inherently structurally weak along their horizontal axis's (i.e., where subsequent layers are in contact). The combined action of forcibly and repeatedly separating the solidified material from a vat floor and inadequate adhesion between layers can result in one or more layers separating causing a failed structure build. In particular, objects that contain dramatic changes in areas of increased solidification can result in fracturing of structurally weak areas that or in highly dense regions of solidified material due to the inability of the structures to provide adequate support and structural integrity and external forces applied to it during the construction process. Increasing the build area in these locations can further exacerbate the problems described above and result in greater risk for printed object fractures via delamination. The process and devices described herein provide reduced surface adhesion between solidified materials and the transparent build and as a result preserve the integrity of delicate geometries that are constructed and enhance the ability to use speeds in the construction process.

Methods incorporating features of the present invention including selectively solidifying the construction material in a relatively small area comparable to the total construction area serve to reduce adhesion forces by minimizing the physical area that generates the adhesion. The rotational motion of the build platform serves to continually remove this adhesion force as it forms preventing adhesion force accumulation. This allows for the construction of a large area with only a small portion of the constructible area ever being subject to the adhesion of material to the substrate at any given time. The transparent substrate be composed of or being treated with non-stick materials, further reduces the effects of adhesion.

Methods which incorporate features of the present invention include rotating the build platform about and above the solidification areas, providing for an innovative method for separating cured materials from a build substrate. The circular motion generated by the rotating build platform provides a superior separation method that reduces damage to newly solidified material because less force is needed to separate or slide the solidified material off the transparent build substrate and less force is applied to the constructed part. This allows the construction of very delicate geometries that can be unsupported, small, tall, thin or isolated and that could otherwise have been damaged in the separation processes of prior art 3D build systems. The method for continuous or semi continuous construction utilizing a rotating mechanism for dispensing and solidifying of photocurable material against a build platform that gradually moves upward along a z-axis results in the creation of at least one continuous spiral or helical shaped layer. This spiral buildup of material results in the formation of an objects with superior layer-to-layer strength characteristics which aides in diminishing the chance for part delamination and results in lower occurrences of failed structures.

The inverted construction process provides several benefits. In several prior art systems an object is built on a platform with a first layer on the platform and subsequent layers are added on top of the prior layers. While some prior systems may use an inverted build, in the present inverted build system, a first layer is continuously applied to a build platform and solidified. However, the first layer is also continuously removed as a solid layer from the build platform during the build process and new material is fed between the first layer and the build platform so as to adhere to the rising prior layer while being continuously removed from the build platform. It allows for solidification of a large area with a relatively shallow layer of material needed, allowing for less material being used during the process compared to the amount of material needed to fill an entire vat. The vertical and inverted construction process utilizes gravity to drain excess material from previously solidified regions. The ability to form hollow cavities within the structure is very beneficial with regards to materials savings, and producing of objects with internal geometries. The use of a material stripper and drain help to further remove excess material for recycling, thus improving the economy of the machine and preventing the unintentional curing of excess material which can allow production an object that more closely resembles an intended product and has sharper details.

The method of utilizing rotational movement for construction, instead of lateral back and forth motion, as referred as oscillation, provides for increased scalability of the machine. Unlike oscillation, rotational elements that are in continuous motion in one direction do not have compensate for momentum resulting from the oscillating movement.

Therefore, a machine that utilizes the described rotational technique can comprise larger and heavier components that would otherwise have significant negative impact on the construction process and operational speed. In this rotational method of construction speed is independent of construction volume. Increasing the size of the construction mechanism and the build platform will result in a greater possible build volume, translating to comparatively faster construction from a given volume of material.

Embodiments of the invention are described herein with reference to different views and schematic illustrations of idealized embodiments of the invention. As such, variations from the shapes of the illustrations as a result, for example, of manufacturing techniques and/or tolerances are expected. Embodiments of the invention should not be construed as limited to the particular shapes of the regions illustrated herein but are contemplated to include deviations in shapes that result, for example, from manufacturing.

While devices, systems and methods incorporating features of the present invention are primarily directed to stereolithographic processes using liquid-based building materials. The techniques of the present invention can have application using other flowable materials and appropriate solidification technologies such as selective laser sintering (SLS), for the purposes of enhancing resolution, faster construction times, economic material use and the ability to form hollow cavities in a constructed object that would otherwise be filled with excess construction materials. Such an embodiment can utilize heated construction materials which are then solidified. The use of a laser diode that emits radiation in the infrared spectrum a construction substrate also transparent to infrared radiation. Thermal and atmospherically control over the material and build chamber 21 is desirable for greater control over the reacting materials in the construction process.

Sintered materials such as metals or powdered polymers can be used with the above process along with a heating and/or radiation source for thermal heating and/or fusing of material. Main differences from the above recited processes can be the possible addition of an atmospheric control system that would fill the build chamber 21 with an inert gas like argon or nitrogen and a thermal control system like infrared heaters. Laser beams can be used to melt and fuse the construction material.

Flowable sinterable materials or additives can also be used as, or as part of, the construction material. The sinterable materials can then be bound in place by the curing of surrounding photopolymers or the melting or binding of a powdered polymers resulting in production of a "green object." This green object then requires the additional steps for converting the green object to create higher part densities, known as post furnace processing which can include debinding which comprises placing the part in a furnace at a temperature that vaporizes or carbonized the binding material and promotes a controlled shrinkage or necking of the green build material to hold its shape while forming a solid structure.

Infiltration, which is a process for infusing the formed solid but porous part with another material, filling in the porous voids in the part. This infused material can have a lower melting point then the main construction material. An example of one such material suitable for infiltration is copper. Molten copper can diffuse into iron powder particles creating swelling. By controlling the copper concentration, it is possible to offset the natural shrinkage of iron during sintering to help preserve part dimensions of the green object. Such a process can also be used to form structures from bio-compatible materials which can then be infused with other biomaterials to form biologically compatible implant structures.

Consolidation is a process which can occur during sintering, results in the product shrinking so as to increase the part density.

With the inclusion of a laser of sufficient power, direct thermal sintering of the construction materials or a concentration of additives contained in a dispensed formulation whose components are capable of fusion to each other and the build platform is possible. This embodiment needs greater thermal control of the material and build chamber 21 as well as a means for regulating the atmosphere which would utilize blanketing of the solidification area with inert gases such as nitrogen and argon and a method for removing any gaseous byproducts.

Examples of sinterable additives are: 17-4 and 15-5 stainless steel, maraging steel, cobalt chromium, Inconel 625 and 718, titanium Ti6Alv4, titanium Ti64, Cobalt Chrome Alloy Co28Cr6Mo, Nickel Alloy In718 Theoretically, almost any alloy metal can be used in this process. Sintering typically involves induced binding, liquid phase sintering and/or full melting. These techniques are known in the art.

Figure 19:
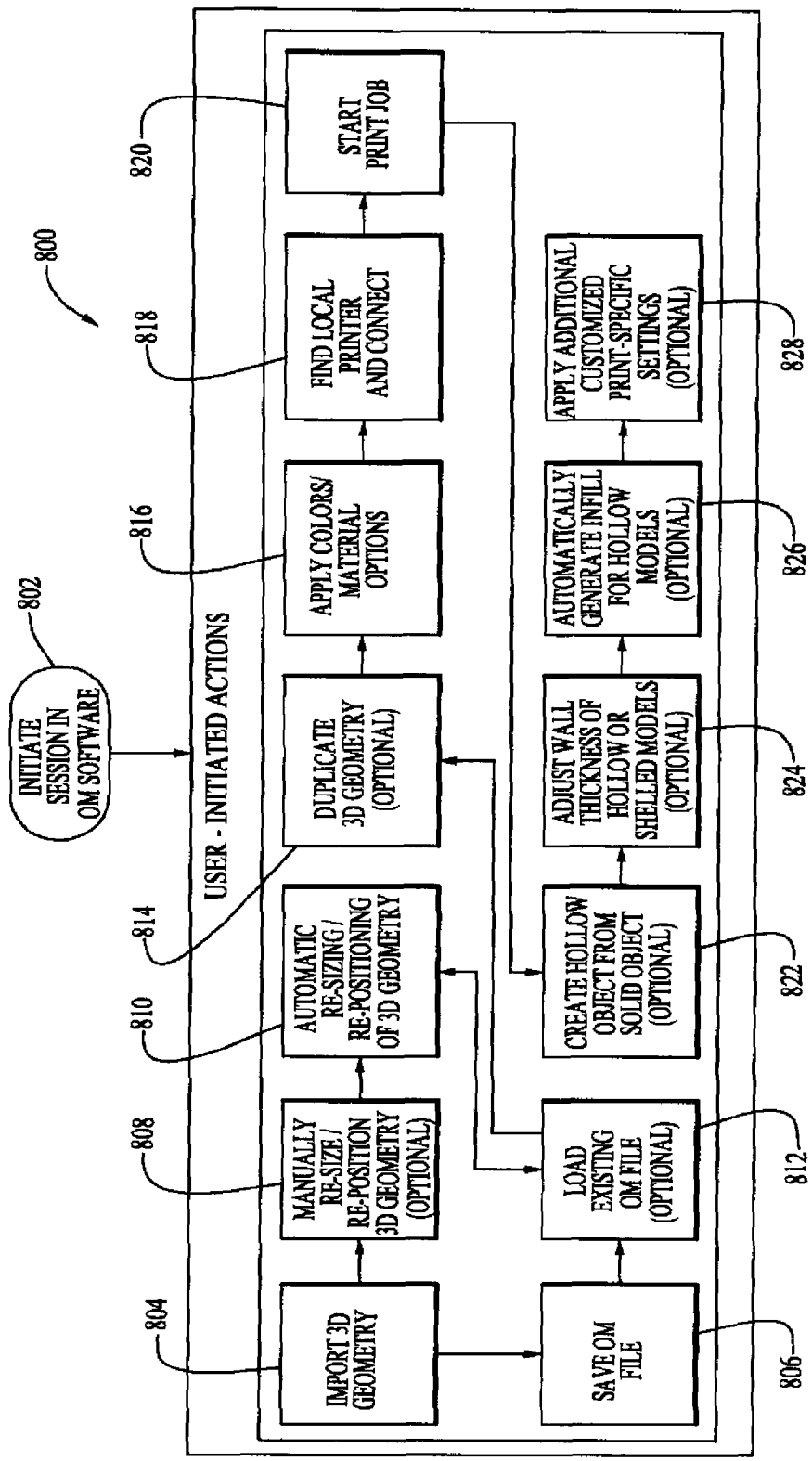
FIG. 19 is a process flow diagram for a specific embodiment for a product buildup using the 3D printer device shown and described herein.
Figures 20, 21:
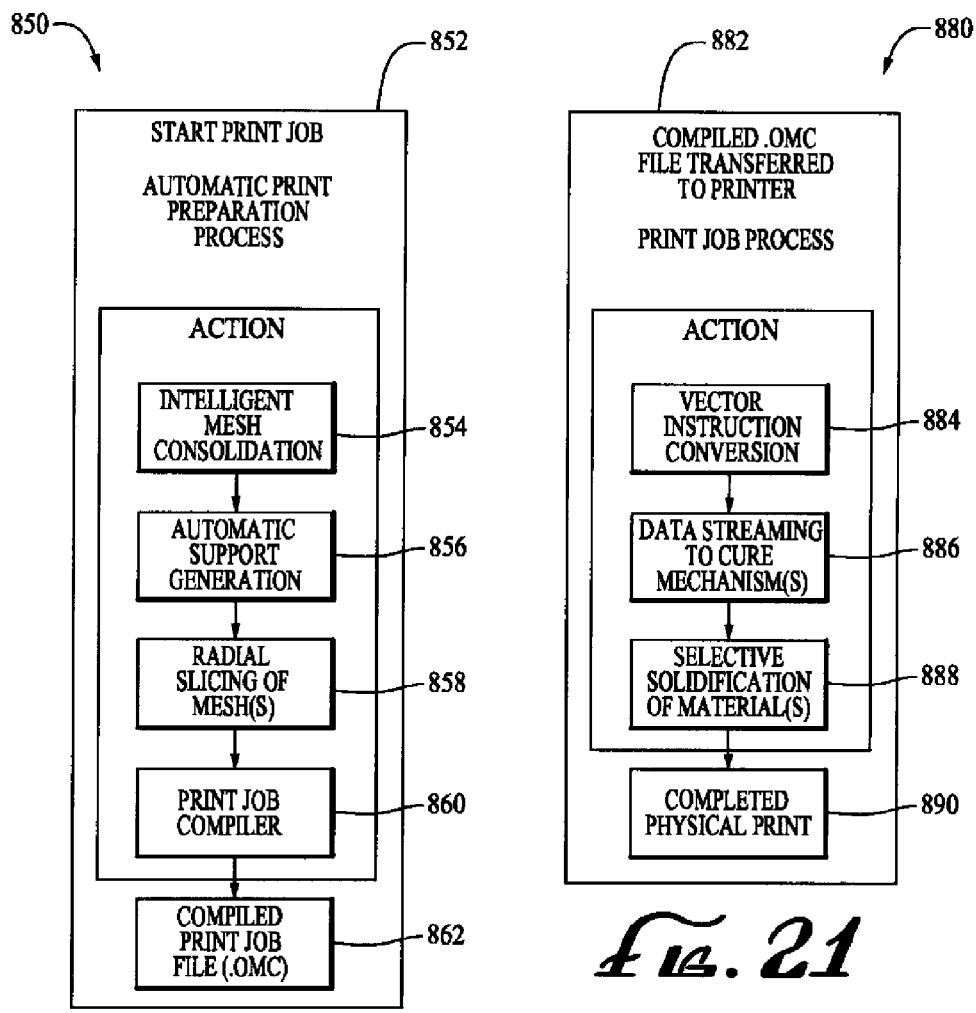
FIG. 20 is a process flow diagram for a specific embodiment for a product buildup using the 3D printer device shown and described herein.
FIG. 21 is a process flow diagram for a specific embodiment for a product buildup using the 3D printer device shown and described herein.

FIGS. 19-21 show a process flow diagram, which can incorporate computer software, for utilizing 3D printing devices incorporating features of the present invention. Regarding FIG. 19, which shows a user-initiated process 800, the session is started in an initiation step 802, which can include the initiation of software, such as OM (an Omicron Compiler File) software or other suitable software. A user can engage in and initiate a series of interrelated user actions. For example, a use can activate an import step 804, wherein the user imports 3D geometry, for example, from existing data or from recently scanned data. From this step, the user can elect to initiate a save step 806, in which the user can save the 3D geometry data, for example, an .OM software file. Alternatively, or in addition to initiating a save step 806, a user can initiate a manual re-size/reposition step 808 of the imported 3D geometry data. The 3D geometry data can then be automatically re-sized/repositioned in an automated adjustment step 810.

At any point, an existing file, for example, an existing .OM file saved in the save step 806 or a manually and automatically adjusted file from the manual and automatic adjustment steps 808, 810 can be loaded into the memory of a user interface in a load step 812. From the load step 812, several additional steps can be initiated. For example, a user can initiate a duplication step 814, wherein one or more aspects of the 3D geometry data can be duplicated. A user can then initiate an application step 816, wherein a user can alter and/or apply colors and other material options to the 3D geometric data. The user can then initiate a connection step 818, wherein the user can locate a local 3D printer and connect, after which the user can initiate a print step 820, wherein the 3D object begins to print.

During the setup process and compiling the print instructions for printing the 3D object in the print step 820, instructions can be provided to produce a solid or a hollow structure and additional steps can be initiated to further define the object. A user can initiate a hollowing step 822, whereby a hollow object is produced instead from, and instead of, an existing solid object. A user can then initiate a hollowness adjustment step 824, whereby the wall thickness of hollow or shelled products can be adjusted. An automated infill step 826 can also be initiated, wherein infill for hollow models is automatically generated. Finally, a user can initiate a customization step 828, wherein additional customized print-specific settings are applied to the 3D object.

It is understood that while the examples cited above specifically refer to .OM files, other software file formats can be utilized. For example, users can import 3D models formatted as AMF, STL, PLY<OBJ, or any other similar file known in the art. Support for auto-detecting colors and/or materials can be included. Each piece of unique imported 3D geometry data can be stored along with the transformation matrix (applied from the origin) and metadata describing color and material selections.

Referring now to FIG. 20, which shows a further process flow diagram 850 incorporating features of the present invention, an automated print preparation (scan) process 852 is initiated by the user or in response to a stimulus, for example, the printer being powered on or receiving a connection signal from a computer or other user interface. In a first step 854, intelligent mesh consolidation of an object being reproduced takes place. In some embodiments, an algorithm is utilized to consolidate all meshes in preparation for slicing. This first step 854 can be used in the production of separate combined meshes each organized by color and material. In a second step 856, the algorithm can, if necessary, automatically generate and add any support structures needed for each combined mesh. In a third step 858, radial slicing of the mesh can occur. In this step 858 one or more algorithms can radially slice the input mesh and produce encoded vector data describing the intended structure to be printed in real-world dimensions utilizing real-world units. This data can be stored and later compiled to machine-specific instructions. Layer height is taken into account at this stage and can be pre-set as a constant value for the entire print or vary throughout the print.

In a fourth step 860, the print job is compiled by one or more algorithms to produce a single compiled (machine-specific) print job file containing all the print information utilized by the printer. In a fifth step 862, this compiled print job file, which can be machine specific and can be in .OM format, is transferred to the printer.

Referring now to FIG. 21, which shows an example of a process flow 880 after a step 882 wherein the print-job file is compiled and transferred to a printer (which can be a continuation of the fifth step 862 in FIG. 20 or proceed directly from a loaded externally or independent provided print file). In a first step 884, an algorithm translates vector instructions from real-world units into a binary arrangement (arrays of individual ones and zeroes) that is used by the printer. In a second step 886, the print processor of the printer streams data bits to the curing mechanism at a hardware-synchronized rate that coincides with the motor/mirror movement. In a third step 888, the actual heliography (curing) process occurs, utilizing continuous computer-controlled selective solidification. In a fourth step 890, a completed physical object mirroring the virtual 3D geometry is produced.

I claim:

1. A method for building a 3D structure by a continuous or semi-continuous build procedure, comprising the steps of:
  a. providing a build platform spaced from and separate from, but substantially parallel to, a substrate, said build platform and/or substrate rotatable multiple 360° turns,
  b. continuously depositing a flowable build material on the substrate in a space between the substrate and the build platform,
  c. said build material solidifying or treated to solidify such that portions of said build material are selectively first solidified to form a first layer of solidified build material attached to said build platform but not the substrate, and
  d. continuously or semi-continuously depositing additional build material on the substrate in the space between the substrate, said solidified build material attached to said build platform, said build material solidifying such that additional portions of said build material are adhered to prior solidified build material attached to the build platform;

wherein said build platform and/or substrate is rotated continuously or semi-continuously during the deposition of build material on the build platform such that the distance between the build platform and the substrate is continuously increased throughout each 360° rotation of the build platform and/or substrate, said build platform and/or substrate rotating multiple 360° turns during the building of said 3D structure.

2. The method of claim 1, wherein said substrate is formed of a material transparent to a radiative source.

3. The method of claim 2, wherein said substrate is glass.

4. The method of claim 1, wherein treating said build material to cause solidification comprises utilizing a radiative source.

5. A method for formation of three-dimensional structures in a vertical orientation by the continuous deposition and solidification of a build material comprising:
  providing a construction frame, a substrate and build platform located within an area defined by said construction frame and providing a construction area between the substrate and the build platform, both the substrate and build platform positioned horizontally within and substantially parallel to each other within the construction frame, the construction frame configured to build a solidified 3D structure in the construction area, said build platform spaced from said substrate a first defined distance,
  providing at least one material dispenser with a flowable build material in said material dispenser,
  dispensing said flowable build material into the construction area, the material dispenser delivering the flowable build material onto an exposure zone of a surface of the substrate,
  continuously or semi-continuously moving said build platform within said construction frame while rotating said build platform multiple 360° rotations so as to provide a continuously increasing defined distance between said build platform and substrate in each 360° rotation of said build platform,
  the build material solidifying or caused to solidify after dispensing into the construction area between the substrate and the build platform, the solidifying build material retained on the build platform as the build platform rotates within the construction frame and moves said increasing defined distance.

6. The method of claim 5 wherein the substrate is positioned below the build platform and the exposure zone is on an upper surface of the substrate.

7. The method of claim 5 wherein the substrate is positioned above the build platform and the exposure zone is on a lower surface of the substrate.

8. The method of claim 5 wherein the build material is caused to solidify by providing a solidification mechanism positioned to deliver a solidifying medium to the flowable build material located on the exposure zone so as to form a solidified build material.

9. The method of claim 8, wherein said solidification mechanism is a radiation source and said exposure zone of said substrate is transparent to radiation delivered from said radiation source located below said transparent exposure zone of the construction area.

10. The method of claim 9, wherein said radiation source is reflected off of one or more mirrors before transmission through the transparent exposure zone.

11. The method of claim 10 wherein said one or more mirrors are moveable in a controlled manner.

12. The method of claim 9, wherein said radiation source comprises one or more LEDs or light sources.

13. The method of claim 9, wherein said radiation source comprises one or more lasers.

14. The method of claim 5, further comprising providing multiple material dispensers.

15. The method of claim 5, wherein said exposure zone comprises a transparent substrate.

16. The method of claim 15, wherein said transparent substrate comprises glass.

17. The method of claim 5, further comprising a drainage system to remove flowable build material that is not solidified from the construction area.

18. The method of claim 5, further comprising a mechanism for removing excess build material from the substrate.

19. The method of claim 5, further comprising providing a material spreader configured to spread the flowable material evenly across the exposure zone of said substrate.

20. The method of claim 5, wherein said build platform is configured to rotate around a central axis and to move up or down in relationship to the construction area.

21. The method of claim 5 further comprising providing a controlled temperature within the construction area.

22. The method of claim 5 further comprising providing controlled atmospheric conditions in the construction area.

23. The method of claim 5, wherein the material dispenser comprises one or more material cartridges for supplying one or more build materials and/or solidifying materials.

24. The method of claim 23 wherein said one or more material cartridges are removable and replaceable.

25. A method for building a 3D structure by a continuous or semi-continuous buildup procedure, comprising:

providing at least one material dispenser for delivery of a solidifyable liquid;

providing a material solidification source, said source causing said liquid to solidify, providing a build platform, and a construction area spaced from said build platform, said construction area having an exposure zone, the exposure zone located in a surface positioned facing the build platform, said surface and said build platform being positioned in substantially parallel planes delivering the solidifyable liquid to said construction area and delivering the solidification source to the solidifyable liquid through the exposure zone, so as to form solidified material, wherein said build platform is configured to rotate multiple 360° turns in relationship to the construction area and continuously or semi-continuously increase, in each 360° rotation, the size of the construction area, said solidified material delivered to said construction area being retained on the lower surface of the build platform.

26. The method of claim 25, further comprising providing a multiple material dispensers.

27. The method of claim 25 wherein said exposure zone comprises a transparent substrate.

28. The method of claim 27 wherein said transparent substrate comprises glass.

29. The method of claim 25 further comprising removing excess liquid from the construction area.

30. The method of claim 25, further comprising providing a material spreader configured to spread solidifyable liquid evenly across said exposure zone and said construction area.

31. The method of claim 25 wherein said build platform is configured to rotate along a Z-axis substantial perpendicular to the build platform.

32. The method of claim 25 further comprising controlling, adjusting and maintaining temperature in the construction area.

33. The method of claim 25 further comprising controlling, adjusting and maintaining temperature in the construction area at predetermined ambient conditions.

34. The method of claim 25 wherein the material dispenser comprising one or more removable material containers and controlling the delivery of material from the one or more material containers.

* * * * *